(12) United States Patent
Driver et al.

(10) Patent No.: US 10,130,176 B2
(45) Date of Patent: *Nov. 20, 2018

(54) SPILL CONTAINING REFRIGERATOR SHELF ASSEMBLY

(71) Applicant: SSW HOLDING COMPANY, LLC, A DELAWARE LIMITED LIABILITY COMPANY, Dallas, TX (US)

(72) Inventors: John Patrick Driver, Henryville, IN (US); Matthew McMillin, Palmyra, IN (US); Bradley M. Nall, Elizabethtown, KY (US)

(73) Assignee: SSW HOLDING COMPANY, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,743

(22) Filed: Mar. 17, 2017

(65) Prior Publication Data

US 2017/0188707 A1 Jul. 6, 2017

Related U.S. Application Data

(63) Continuation of application No. 14/921,322, filed on Oct. 23, 2015, now abandoned, which is a
(Continued)

(51) Int. Cl.
*A47B 96/02* (2006.01)
*A47B 96/06* (2006.01)
(Continued)

(52) U.S. Cl.
CPC .......... *A47B 96/021* (2013.01); *A47B 95/043* (2013.01); *A47B 96/027* (2013.01);
(Continued)

(58) Field of Classification Search
CPC .... A47B 95/043; A47B 96/027; A47B 96/028
(Continued)

(56) References Cited

U.S. PATENT DOCUMENTS

| 392,061 A | 10/1888 | Peckham |
| 870,439 A | 11/1907 | Kade |
| (Continued) | | |

FOREIGN PATENT DOCUMENTS

| CA | 2175848 A1 | 12/1996 |
| CN | 2113879 U | 8/1992 |
| (Continued) | | |

OTHER PUBLICATIONS

European Examination Report for European Application No. 10757348.7 dated Feb. 8, 2017.
(Continued)

*Primary Examiner* — Jose V Chen
(74) *Attorney, Agent, or Firm* — Marshall, Gerstein & Borun LLP

(57) ABSTRACT

The specification discloses a method for containing spills on shelving and the like, and the resulting support members made in accordance with the method, by providing the generally flat top surface of a support with a hydrophobic surface which is arranged in a spill containment pattern and which is generally in the plane of the top surface of the support. The majority of the top surface of the support consists of one or more spill containment areas which are of a non-hydrophobic nature and which are bounded by the hydrophobic surfaces, such that spills on the shelving collect in the non-hydrophobic spill containment area or areas and are prevented from spreading by the hydrophobic surfaces.

20 Claims, 18 Drawing Sheets

Related U.S. Application Data continuation of application No. 14/463,469, filed on Aug. 19, 2014, now Pat. No. 9,207,012, which is a continuation of application No. 13/891,954, filed on May 10, 2013, now Pat. No. 9,179,773, which is a continuation of application No. 13/651,842, filed on Oct. 15, 2012, now Pat. No. 8,596,205, which is a continuation-in-part of application No. 13/000,487, filed as application No. PCT/US2009/048775 on Jun. 26, 2009, now abandoned, said application No. 13/651,842 is a continuation of application No. 12/562,920, filed on Sep. 18, 2009, now Pat. No. 8,286,561, which is a continuation-in-part of application No. PCT/US2009/048775, filed on Jun. 26, 2009.

(60) Provisional application No. 61/216,540, filed on May 18, 2009, provisional application No. 61/133,273, filed on Jun. 27, 2008.

(51) Int. Cl.
  A47B 95/04      (2006.01)
  F25D 25/02      (2006.01)
  C03C 17/30      (2006.01)
  C03C 15/00      (2006.01)

(52) U.S. Cl.
  CPC .......... *A47B 96/028* (2013.01); *A47B 96/062* (2013.01); *C03C 15/00* (2013.01); *C03C 17/30* (2013.01); *F25D 25/024* (2013.01); *C03C 2217/76* (2013.01); *C03C 2218/34* (2013.01); *F25D 2325/022* (2013.01); *F25D 2400/22* (2013.01)

(58) Field of Classification Search
  USPC .......... 108/27, 161, 106, 108; 312/408, 404, 312/351; 211/191, 41.11, 41.18; 428/212
  See application file for complete search history.

(56) References Cited

U.S. PATENT DOCUMENTS

| | | |
|---|---|---|
| 2,191,701 A | 2/1940 | Wood |
| 2,976,386 A | 3/1961 | Salton |
| 3,185,426 A | 5/1965 | Bjerke |
| 3,354,022 A | 11/1967 | Dettre et al. |
| 3,579,540 A | 5/1971 | Ohlhausen |
| 3,716,502 A | 2/1973 | Loew |
| 3,931,428 A | 1/1976 | Reick |
| 3,963,349 A | 6/1976 | Albright et al. |
| 3,967,030 A | 6/1976 | Johnson et al. |
| 3,975,197 A | 8/1976 | Mikelsons |
| 3,976,572 A | 8/1976 | Reick |
| 3,980,153 A | 9/1976 | Andrews |
| 4,142,724 A | 3/1979 | Reick |
| 4,151,327 A | 4/1979 | Lawton |
| 4,184,936 A | 1/1980 | Paul et al. |
| 4,199,142 A | 4/1980 | Reick |
| 4,301,197 A | 11/1981 | Franz et al. |
| 4,301,213 A | 11/1981 | Davies |
| 4,311,755 A | 1/1982 | Rummel |
| 4,415,405 A | 11/1983 | Ruddle et al. |
| 4,451,619 A | 5/1984 | Heilmann et al. |
| 4,453,533 A | 6/1984 | Scheidler et al. |
| 4,492,217 A | 1/1985 | Scheidler |
| 4,581,149 A | 4/1986 | Horodysky et al. |
| 4,591,530 A | 5/1986 | Lui |
| 4,614,464 A | 9/1986 | Christensen |
| 4,624,900 A | 11/1986 | Fau |
| 4,646,948 A | 3/1987 | Jennings |
| 4,680,173 A | 7/1987 | Burger |
| 4,687,707 A | 8/1987 | Matsuo et al. |
| 4,717,810 A | 1/1988 | Schreder |
| 4,733,843 A | 3/1988 | Bessinger |
| 4,738,426 A | 4/1988 | Bessinger |
| D295,950 S | 5/1988 | Johnston |
| 4,749,110 A | 6/1988 | Maeno et al. |
| 4,753,977 A | 6/1988 | Merrill |
| 4,782,112 A | 11/1988 | Kondo et al. |
| 4,835,014 A | 5/1989 | Roth et al. |
| 4,855,176 A | 8/1989 | Ohwaki et al. |
| 4,870,907 A | 10/1989 | McKee |
| 4,923,260 A | 5/1990 | Poulsen |
| 4,934,541 A | 6/1990 | Bussan et al. |
| 4,971,912 A | 11/1990 | Buhl et al. |
| 4,983,459 A | 1/1991 | Franz et al. |
| 4,997,684 A | 3/1991 | Franz et al. |
| 5,004,302 A | 4/1991 | Stocking et al. |
| 5,009,652 A | 4/1991 | Morgan et al. |
| 5,011,727 A | 4/1991 | Kido et al. |
| 5,011,963 A | 4/1991 | Ogawa et al. |
| 5,032,641 A | 7/1991 | Nanishi et al. |
| 5,041,304 A | 8/1991 | Kusano et al. |
| 5,057,050 A | 10/1991 | Hill |
| 5,069,408 A | 12/1991 | Bessinger |
| 5,084,191 A | 1/1992 | Nagase et al. |
| 5,121,134 A | 6/1992 | Albinson et al. |
| 5,156,611 A | 10/1992 | Haynes et al. |
| 5,202,361 A | 4/1993 | Zimmerman et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,273,354 A | 12/1993 | Herrmann et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,352,733 A | 10/1994 | Hart |
| 5,358,773 A | 10/1994 | Fujii et al. |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,403,084 A | 4/1995 | Kane et al. |
| 5,406,894 A | 4/1995 | Herrmann et al. |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,454,638 A | 10/1995 | Bird et al. |
| 5,458,976 A | 10/1995 | Horino et al. |
| 5,464,492 A | 11/1995 | Gregory et al. |
| 5,466,770 A | 11/1995 | Audenaert et al. |
| 5,489,328 A | 2/1996 | Ono et al. |
| 5,500,216 A | 3/1996 | Julian et al. |
| 5,516,204 A | 5/1996 | Calvert et al. |
| 5,523,161 A | 6/1996 | Goodwin |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,577,817 A | 11/1996 | Reynolds |
| 5,578,361 A | 11/1996 | Tsujioka et al. |
| 5,584,957 A | 12/1996 | Schultheis et al. |

(56) References Cited

U.S. PATENT DOCUMENTS

| | | |
|---|---|---|
| 5,585,896 A | 12/1996 | Yamazaki et al. |
| 5,590,861 A | 1/1997 | Ardolino |
| 5,599,893 A | 2/1997 | Asai et al. |
| 5,612,433 A | 3/1997 | Ono et al. |
| 5,618,627 A | 4/1997 | Merrifield et al. |
| 5,651,921 A | 7/1997 | Kaijou |
| 5,660,777 A | 8/1997 | Herrmann et al. |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,705,113 A | 1/1998 | Kane et al. |
| 5,707,740 A | 1/1998 | Goodwin |
| 5,725,789 A | 3/1998 | Huber et al. |
| 5,735,589 A | 4/1998 | Herrmann et al. |
| 5,738,880 A | 4/1998 | Kane et al. |
| 5,747,561 A | 5/1998 | Smirnov et al. |
| 5,753,734 A | 5/1998 | Maruyama |
| 5,798,144 A | 8/1998 | Varanasi et al. |
| 5,800,785 A | 9/1998 | Bochner |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,259 A | 11/1998 | Kim et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,853,894 A | 12/1998 | Brown |
| 5,856,378 A | 1/1999 | Ring et al. |
| 5,858,551 A | 1/1999 | Salsman |
| 5,876,806 A | 3/1999 | Ogawa |
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 5,989,757 A | 11/1999 | Satoi |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,024,948 A | 2/2000 | Samain et al. |
| 6,025,025 A | 2/2000 | Bartrug et al. |
| 6,033,738 A | 3/2000 | Teranishi et al. |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,155,677 A | 12/2000 | Kitani et al. |
| 6,187,143 B1 | 2/2001 | Juppo et al. |
| 6,191,122 B1 | 2/2001 | Lux et al. |
| 6,196,141 B1 | 3/2001 | Herron, III et al. |
| 6,197,438 B1 | 3/2001 | Faulkner |
| 6,201,058 B1 | 3/2001 | Mahr et al. |
| 6,207,236 B1 | 3/2001 | Araki et al. |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,264,751 B1 | 7/2001 | Kamura et al. |
| 6,280,834 B1 | 8/2001 | Veerasamy et al. |
| 6,291,054 B1 | 9/2001 | Thomas et al. |
| 6,308,728 B1 | 10/2001 | Frazier |
| 6,333,074 B1 | 12/2001 | Ogawa et al. |
| 6,337,133 B1 | 1/2002 | Akamatsu et al. |
| 6,340,502 B1 | 1/2002 | Azzopardi et al. |
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,371,034 B1 | 4/2002 | Simpson et al. |
| 6,372,507 B1 | 4/2002 | Angros |
| 6,376,592 B1 | 4/2002 | Shimada et al. |
| 6,379,751 B1 | 4/2002 | Schafer et al. |
| 6,383,642 B1 | 5/2002 | Le Bellac et al. |
| 6,403,397 B1 | 6/2002 | Katz |
| 6,422,673 B1 | 7/2002 | Bienick |
| 6,423,372 B1 | 7/2002 | Genzer et al. |
| 6,451,432 B1 | 9/2002 | Azzopardi et al. |
| 6,458,420 B1 | 10/2002 | Akamatsu et al. |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,555,384 B1 | 4/2003 | Angros |
| 6,564,935 B1 | 5/2003 | Yamamoto et al. |
| 6,579,620 B2 | 6/2003 | Mizunno et al. |
| 6,582,825 B2 | 6/2003 | Amarasekera et al. |
| 6,584,744 B1 | 7/2003 | Schultheis et al. |
| 6,596,060 B1 | 7/2003 | Michaud |
| 6,604,800 B2 | 8/2003 | Hamilton |
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,644,609 B1 | 11/2003 | Scott |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,679,573 B2 | 1/2004 | Bienick |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,713,304 B2 | 3/2004 | Angros |
| 6,720,371 B2 | 4/2004 | Furuta et al. |
| 6,729,704 B2 | 5/2004 | Ames |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,045 B1 | 11/2004 | Masker et al. |
| 6,811,716 B1 | 11/2004 | Stengard et al. |
| 6,811,844 B2 | 11/2004 | Trouilhet |
| 6,818,451 B2 | 11/2004 | Angros |
| 6,845,788 B2 | 1/2005 | Extrand |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,890,360 B2 | 5/2005 | Cole et al. |

(56) References Cited

U.S. PATENT DOCUMENTS

| | | |
|---|---|---|
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,994,045 B2 | 2/2006 | Paszkowski |
| 6,998,051 B2 | 2/2006 | Chattopadhyay et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,108,833 B2 | 9/2006 | Samsoondar |
| 7,109,256 B2 | 9/2006 | Amano et al. |
| 7,112,369 B2 | 9/2006 | Wang et al. |
| 7,148,181 B2 | 12/2006 | Tanaka et al. |
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al. |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,468 B1 | 9/2007 | Manel et al. |
| 7,273,658 B2 | 9/2007 | Banayoun et al. |
| 7,285,331 B1 | 10/2007 | Reihs et al. |
| 7,288,311 B2 | 10/2007 | Kawashima et al. |
| 7,291,653 B2 | 11/2007 | Baumann et al. |
| 7,306,304 B2 | 12/2007 | Jang |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| D568,344 S | 5/2008 | Baacke et al. |
| 7,368,510 B2 | 5/2008 | Lee et al. |
| 7,388,211 B2 | 6/2008 | Chao et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,478,785 B2 | 1/2009 | Herron, III et al. |
| 7,524,531 B2 | 4/2009 | Axtell, III et al. |
| 7,527,832 B2 | 5/2009 | Sakoske et al. |
| 7,544,411 B2 | 6/2009 | Baumann et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,919,180 B2 | 4/2011 | Furukawa |
| 7,943,234 B2 | 5/2011 | Lawin et al. |
| 7,989,619 B2 | 8/2011 | Guire et al. |
| 8,071,219 B2 | 12/2011 | Berrux et al. |
| 8,192,994 B2 | 6/2012 | Angros |
| 8,262,177 B2 | 9/2012 | Picken et al. |
| 8,286,561 B2 | 10/2012 | Driver et al. |
| 8,287,062 B2 | 10/2012 | Nash et al. |
| 8,372,496 B2 | 2/2013 | Le Bris et al. |
| 8,596,205 B2 | 12/2013 | Driver et al. |
| 9,179,773 B2 | 11/2015 | Driver et al. |
| 9,207,012 B2 | 12/2015 | Driver et al. |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0024805 A1 | 9/2001 | Williams et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |
| 2002/0077412 A1 | 6/2002 | Kobayashi et al. |
| 2002/0111402 A1 | 8/2002 | Mizuno et al. |
| 2002/0119595 A1 | 8/2002 | Kim et al. |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0006683 A1 | 1/2003 | Bienick |
| 2003/0021902 A1 | 1/2003 | Yamamoto et al. |
| 2003/0026972 A1 | 2/2003 | Reihs |
| 2003/0038571 A1 | 2/2003 | Obrock et al. |
| 2003/0040243 A1 | 2/2003 | Ward |
| 2003/0040568 A1 | 2/2003 | Furuta et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0179494 A1 | 9/2003 | Kaneko |
| 2004/0005469 A1 | 1/2004 | Metz et al. |
| 2004/0025747 A1 | 2/2004 | Kamitani et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0121168 A1 | 6/2004 | Goodwin et al. |
| 2004/0137814 A1 | 7/2004 | Kimbrell et al. |
| 2004/0138083 A1 | 7/2004 | Kimbrell et al. |
| 2004/0149304 A1 | 8/2004 | Noguchi et al. |
| 2004/0154106 A1 | 8/2004 | Oles et al. |
| 2004/0173549 A1 | 9/2004 | Herron et al. |
| 2004/0179973 A1 | 9/2004 | Angros |
| 2004/0201048 A1 | 10/2004 | Seki et al. |
| 2004/0209072 A1 | 10/2004 | Henze et al. |

(56) References Cited

U.S. PATENT DOCUMENTS

| | | |
|---|---|---|
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2004/0245146 A1 | 12/2004 | Kulp et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0022313 A1 | 2/2005 | Scheidler |
| 2005/0031489 A1 | 2/2005 | Angros |
| 2005/0053793 A1 | 3/2005 | Benay-Oun et al. |
| 2005/0063876 A1 | 3/2005 | Angros |
| 2005/0070026 A1 | 3/2005 | Angros |
| 2005/0075020 A1 | 4/2005 | Benayoun et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0207032 A1 | 9/2006 | Reiners et al. |
| 2006/0213849 A1 | 9/2006 | Bienick |
| 2006/0222865 A1 | 10/2006 | Hoshino et al. |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0028625 A1 | 2/2007 | Joshi et al. |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0012459 A1 | 1/2008 | Picken et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0133276 A1 | 6/2008 | Abe et al. |
| 2008/0160257 A1 | 7/2008 | Takada et al. |
| 2008/0166549 A1 | 7/2008 | Shieh et al. |
| 2008/0171805 A1 | 7/2008 | Mingarelli et al. |
| 2008/0172937 A1 | 7/2008 | Palmer et al. |
| 2008/0176991 A1 | 7/2008 | Osawa et al. |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Boriner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |
| 2008/0226694 A1 | 9/2008 | Gelbart et al. |
| 2008/0233355 A1 | 9/2008 | Henze et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2008/0316587 A1 | 12/2008 | Tijburg et al. |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0134758 A1 | 5/2009 | Vardon |

(56) References Cited

U.S. PATENT DOCUMENTS

| | | |
|---|---|---|
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0195136 A1 | 8/2009 | Wing et al. |
| 2009/0212505 A1 | 8/2009 | McMillin et al. |
| 2009/0216540 A1 | 8/2009 | Tessel et al. |
| 2009/0226648 A1 | 9/2009 | Wild et al. |
| 2009/0298369 A1 | 12/2009 | Koene et al. |
| 2010/0001625 A1 | 1/2010 | Eckartsberg et al. |
| 2010/0003493 A1 | 1/2010 | Cheng et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0294721 A1 | 11/2010 | Frazier et al. |
| 2010/0330347 A1 | 12/2010 | Badyal et al. |
| 2011/0164399 A1 | 7/2011 | Driver et al. |
| 2011/0198976 A1 | 8/2011 | Bradley et al. |
| 2011/0268973 A1 | 11/2011 | Guire et al. |
| 2012/0009396 A1 | 1/2012 | Sikka et al. |
| 2012/0045954 A1 | 2/2012 | Bleecher et al. |
| 2012/0104924 A1 | 5/2012 | Nash et al. |
| 2012/0104925 A1 | 5/2012 | Nash et al. |
| 2012/0216880 A1 | 8/2012 | Nall et al. |
| 2012/0234113 A1 | 9/2012 | Angros |
| 2013/0037505 A1 | 2/2013 | Driver et al. |
| 2014/0138337 A1 | 5/2014 | Curdt et al. |

FOREIGN PATENT DOCUMENTS

| | | |
|---|---|---|
| CN | 1566891 A | 1/2005 |
| CN | 101046271 A | 10/2007 |
| CN | 101331411 | 12/2008 |
| DE | 10018671 A1 | 10/2001 |
| EP | 0 207 282 A2 | 1/1987 |
| EP | 0 307 915 A2 | 3/1989 |
| EP | 0 317 057 A2 | 5/1989 |
| EP | 0 332 141 A2 | 9/1989 |
| EP | 0 399 568 A2 | 11/1990 |
| EP | 0 452 723 A1 | 10/1991 |
| EP | 0 472 215 A2 | 2/1992 |
| EP | 0 493 270 A2 | 7/1992 |
| EP | 0527658 A1 | 2/1993 |
| EP | 0545201 A2 | 6/1993 |
| EP | 0 623 656 A2 | 11/1994 |
| EP | 0 649 887 A2 | 4/1995 |
| EP | 0 657 393 A1 | 6/1995 |
| EP | 0 657 939 A2 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |
| EP | 0 752 459 A2 | 1/1997 |
| EP | 0 770 706 A1 | 5/1997 |
| EP | 0 799 791 A1 | 10/1997 |
| EP | 0 811 430 A1 | 12/1997 |
| EP | 0856712 A2 | 8/1998 |
| EP | 0859207 A2 | 8/1998 |
| EP | 0 863 191 A2 | 9/1998 |
| EP | 0 903 389 A1 | 3/1999 |
| EP | 0 904 343 A1 | 3/1999 |
| EP | 0 914 873 A2 | 5/1999 |
| EP | 0 915 103 A1 | 5/1999 |
| EP | 0913369 A1 | 5/1999 |
| EP | 0 930 351 A1 | 7/1999 |
| EP | 0 969 718 A1 | 1/2000 |
| EP | 1 047 735 A2 | 11/2000 |
| EP | 1 048 666 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 261 559 A1 | 12/2002 |
| EP | 1 360 253 A2 | 11/2003 |
| EP | 1 362 904 A1 | 11/2003 |
| EP | 1 387 011 A1 | 2/2004 |
| EP | 1 387 169 A1 | 2/2004 |
| EP | 1 392 619 A1 | 3/2004 |
| EP | 1 392 772 A1 | 3/2004 |
| EP | 1 401 903 A2 | 3/2004 |
| EP | 1 407 792 A1 | 4/2004 |
| EP | 1 429 919 A1 | 6/2004 |
| EP | 1 433 821 A1 | 6/2004 |
| EP | 1 473 355 A1 | 11/2004 |
| EP | 1 475 234 A1 | 11/2004 |
| EP | 1 479 738 A1 | 11/2004 |
| EP | 1 492 837 A1 | 1/2005 |
| EP | 1 503 813 A1 | 2/2005 |
| EP | 1 524 290 A1 | 4/2005 |
| EP | 1 583 615 A1 | 10/2005 |
| EP | 1 752 284 A1 | 2/2007 |
| EP | 1 857 497 A2 | 11/2007 |
| EP | 1 873 218 A1 | 1/2008 |
| EP | 1 875 279 A1 | 1/2008 |
| EP | 1 883 669 A1 | 2/2008 |
| EP | 1 902 091 A2 | 3/2008 |
| EP | 1 908 804 A1 | 4/2008 |
| EP | 1 988 129 A2 | 11/2008 |
| EP | 1 997 619 A1 | 12/2008 |
| EP | 2318793 A1 | 5/2011 |
| GB | 1 341 605 A | 12/1973 |
| JP | 62-246960 A | 10/1987 |
| JP | H1113355 A | 1/1999 |
| JP | 2004308984 A | 11/2004 |
| JP | 2007182491 A | 7/2007 |
| JP | 2008228958 A | 10/2008 |
| JP | 2009071672 A | 4/2009 |
| KR | 10-2003-0052853 | 6/2003 |
| MX | 175646 | 8/1994 |
| MX | 183533 | 12/1996 |
| MX | 192053 | 5/1999 |
| MX | 195031 | 1/2000 |
| MX | 199899 | 11/2000 |
| MX | 201072 | 3/2001 |
| MX | 203880 | 8/2001 |
| MX | 205074 | 11/2001 |
| MX | PA01011653 A | 12/2002 |
| MX | 215752 | 8/2003 |
| MX | PA02006399 A | 9/2003 |
| MX | PA04010165 A | 2/2005 |
| MX | PA05006898 A | 8/2005 |
| MX | PA02012841 A | 1/2006 |
| MX | 234477 | 2/2006 |
| MX | PA06003323 | 3/2006 |
| WO | WO-91/04305 A1 | 4/1991 |
| WO | WO-93/16131 A1 | 8/1993 |
| WO | WO-94/13734 A1 | 6/1994 |
| WO | WO-96/04123 A1 | 2/1996 |
| WO | WO-96/07621 A1 | 3/1996 |
| WO | WO-97/07993 A1 | 3/1997 |
| WO | WO-98/20960 A1 | 5/1998 |
| WO | WO-99/23137 A1 | 5/1999 |
| WO | WO-99/23437 A1 | 5/1999 |
| WO | WO-99/40431 A1 | 8/1999 |
| WO | WO-99/47578 A1 | 9/1999 |
| WO | WO-99/48339 A1 | 9/1999 |

(56) References Cited

FOREIGN PATENT DOCUMENTS

| | | |
|---|---|---|
| WO | WO-99/57185 A1 | 11/1999 |
| WO | WO-99/64363 A1 | 12/1999 |
| WO | WO-00/05321 A1 | 2/2000 |
| WO | WO-00/14297 A1 | 3/2000 |
| WO | WO-00/25938 A1 | 5/2000 |
| WO | WO-00/34361 A1 | 6/2000 |
| WO | WO-00/39240 A1 | 7/2000 |
| WO | WO-00/46464 A1 | 8/2000 |
| WO | WO-00/66241 A1 | 11/2000 |
| WO | WO-01/19745 A1 | 3/2001 |
| WO | WO-01/62682 A1 | 8/2001 |
| WO | WO-01/74739 A1 | 10/2001 |
| WO | WO-01/79142 A1 | 10/2001 |
| WO | WO-01/79371 A2 | 10/2001 |
| WO | WO-01/98399 A1 | 12/2001 |
| WO | WO-02/14417 A1 | 2/2002 |
| WO | WO-02/20259 A1 | 3/2002 |
| WO | WO-02/28951 A1 | 4/2002 |
| WO | WO-02/62910 A2 | 8/2002 |
| WO | WO-02/74869 A1 | 9/2002 |
| WO | WO-02/98983 A1 | 12/2002 |
| WO | WO-03/10255 A2 | 2/2003 |
| WO | WO-03/12004 A1 | 2/2003 |
| WO | WO-03/30879 A1 | 4/2003 |
| WO | WO-03/37702 A1 | 5/2003 |
| WO | WO-03/45693 A1 | 6/2003 |
| WO | WO-03/80258 A2 | 10/2003 |
| WO | WO-03/82998 A1 | 10/2003 |
| WO | WO-03/93568 A1 | 11/2003 |
| WO | WO-2004/012625 A2 | 2/2004 |
| WO | WO-2004/043319 A2 | 5/2004 |
| WO | WO-2004/058418 A1 | 7/2004 |
| WO | WO-2004/072556 A1 | 8/2004 |
| WO | WO-2004/104116 A1 | 12/2004 |
| WO | WO-2004/110132 A2 | 12/2004 |
| WO | WO-2005/021843 A1 | 3/2005 |
| WO | WO-2005/023935 A1 | 3/2005 |
| WO | WO-2005/028562 A1 | 3/2005 |
| WO | WO-2005/068399 A1 | 7/2005 |
| WO | WO-2005/077429 A1 | 8/2005 |
| WO | WO-2006/044641 A2 | 4/2006 |
| WO | WO-2006/044642 A2 | 4/2006 |
| WO | WO-2006/081891 A1 | 8/2006 |
| WO | WO-2006/083600 A1 | 8/2006 |
| WO | WO-2006/101934 A1 | 9/2006 |
| WO | WO-2006/135755 A2 | 12/2006 |
| WO | WO-2007/011731 A2 | 1/2007 |
| WO | WO-2007/027276 A1 | 3/2007 |
| WO | WO-2007/052260 A2 | 5/2007 |
| WO | WO-2007/053266 A1 | 5/2007 |
| WO | WO-2007/056427 A2 | 5/2007 |
| WO | WO-2007/070801 A2 | 6/2007 |
| WO | WO-2007/075407 A1 | 7/2007 |
| WO | WO-2007/092746 A2 | 8/2007 |
| WO | WO-2007/102960 A2 | 9/2007 |
| WO | WO-2007/104494 A1 | 9/2007 |
| WO | WO-2007/126432 A1 | 11/2007 |
| WO | WO-2007/126743 A1 | 11/2007 |
| WO | WO-2007/130294 A2 | 11/2007 |
| WO | WO-2007/149617 A1 | 12/2007 |
| WO | WO-2008/004827 A1 | 1/2008 |
| WO | WO-2008/004828 A1 | 1/2008 |
| WO | WO-2008/006078 A2 | 1/2008 |
| WO | WO-2008/021791 A2 | 2/2008 |
| WO | WO-2008/035347 A2 | 3/2008 |
| WO | WO-2008/035917 A1 | 3/2008 |
| WO | WO-2008/050895 A1 | 5/2008 |
| WO | WO-2008/051221 A2 | 5/2008 |
| WO | WO-2008/066828 A2 | 6/2008 |
| WO | WO-2008/078346 A1 | 7/2008 |
| WO | WO-2008/106494 A1 | 9/2008 |
| WO | WO-2008/112158 A1 | 9/2008 |
| WO | WO-2008/123650 A1 | 10/2008 |
| WO | WO-2008/123955 A1 | 10/2008 |
| WO | WO-2008/123961 A1 | 10/2008 |
| WO | WO-2008/134243 A1 | 11/2008 |
| WO | WO-2008/137973 A1 | 11/2008 |
| WO | WO-2008/151991 A1 | 12/2008 |
| WO | WO-2008/153687 A2 | 12/2008 |
| WO | WO-2009/003847 A1 | 1/2009 |
| WO | WO-2009/005465 A1 | 1/2009 |
| WO | WO-2009/012116 A2 | 1/2009 |
| WO | WO-2009/018327 A2 | 2/2009 |
| WO | WO-2009/037717 A2 | 3/2009 |
| WO | WO-2009/041752 A1 | 4/2009 |
| WO | WO-2009/061199 A1 | 5/2009 |
| WO | WO-2009/148611 A1 | 12/2009 |
| WO | WO-2009/158567 A1 | 12/2009 |
| WO | WO-2010/042191 A1 | 4/2010 |
| WO | WO-2010/042668 A1 | 4/2010 |
| WO | WO-2012/115986 A1 | 8/2012 |

OTHER PUBLICATIONS

U.S. Appl. No. 60/699,200, Guire et al.
U.S. Appl. No. 60/807,143, Guire et al.
U.S. Appl. No. 60/891,876, Lawin et al.
U.S. Appl. No. 61/058,902, Driver et al.
U.S. Appl. No. 61/090,002, Driver et al.
U.S. Appl. No. 61/103,295, Sikka et al.
U.S. Appl. No. 61/133,273, Driver et al.
U.S. Appl. No. 61/159,914, Sirka et al.
U.S. Appl. No. 61/216,540, Driver et al.
2009 R&D 100 Award Entry Form (p. 5 excerpt from another document) showing Fig. 1 Schematic of NICE ("no ice nanocoating") (2009).
Bayer Materials Science product information on Bayhydrol® 110 polyurethane dispersion (two first pages of this brochure) (Aug. 2002).
Bayer Materials Science product information on Bayhydrol® 122 polyurethane dispersion (Jan. 2004).
Bayer Materials Science product information on Bayhydrol® 124 polyurethane dispersion (Jan. 2004).
Bayer Materials Science product information on Bayhydrol® 140AQ polyurethane dispersion (Aug. 2002).
Bayer Materials Science product information on Bayhydrol® A145, aqueous hydroxyl-functional polyurethane dispersion (Jan. 2010).
Clark et al., Paints and Pigments, dowloaded from the Internet at: <http://nzic.org.nz/ChemProcesses/polymers/10D.pdf> (copyright 2005-8).
Declaration of Chris B. Schechter filed before the Patent and Trial Board on Jun. 14, 2013.
Du, Surfactants, Dispersants, and Defoamers for the Coatings, Inks, and Adhesives Industries, p. 7, In: Tracton (ed.): Coatings Technology Handbook, 3rd edition, Taylor & Francis Group (2005).
EPO Communication regarding third-party observations in corresponding European application No. 09771098.2 (dated Dec. 5, 2011).
European Examination Report for Application No. 10776886.3, dated May 8, 2013.
Extended European search report from corresponding European application No. 09771098.2, dated Dec. 27, 2011.
Final Office Action for U.S. Appl. No. 13/651,842 dated Apr. 8, 2013.
Final Office Action, U.S. Appl. No. 12/835,913, Badyal et al. dated Oct. 23, 2012.
First Office Action from the State Intellectual Property Office of P.R. China from counterpart application CN200980124417.6 (dated Mar. 1, 2012) (English and Chinese).
Guilman, Limit the messes with the spillproof slideout shelf in the GE Profile refrigerators Nov. 13, 2008.
International Preliminary Report on Patentability for corresponding international application No. PCT/US2009/048775, dated Jan. 13, 2011.
International Preliminary Report on Patentability, PCT/US2010/059909, dated Jul. 4, 2012.
International Search Report and Written Opinion for International Application No. PCT/US2010/048711, dated Mar. 17, 2011.

(56) References Cited

OTHER PUBLICATIONS

International Search Report and Written Opinion from corresponding International Application No. PCT/US2009/048775, dated Nov. 19, 2009.
International Search Report and Written Opinion from International Application No. PCT/US2010/054936, dated Feb. 16, 2011.
International Search Report and Written Opinion, PCT/US2009/005512, dated Dec. 8, 2009.
International Search Report and Written Opinion, PCT/US2010/059909, dated Feb. 9, 2011.
International Search Report and Written Opinion, PCT/US2012/025982, dated Jun. 13, 2012.
Kobayashi et al., Surface Tension of Poly[(3,3,4,4,5,5,6,6,6-nonafluorohexyl)-methylsiloxane], Marcomolecules, 23:4929-4933 (1990).
Le Marechal et al., Textile Finishing Industry as an Important Source of Organic Pollutants, In: Puzyn (ed.), Organic Pollutants Ten Years After the Stockholm Convention—Environmental and Analytical Update, In Tech (2012).
Ming et al., Toward Superlyophobic Surfaces, p. 200 In: Mittal (ed.), Contact Angle, Wettability and Adhesion, vol. 6 (2006).
NeverWet coatings are superhydrophobic surfaces, downloaded from the Internet at: <http://www.neverwet.com/product-characteristics.php> (Mar. 7, 2013).
Nonfinal Office Action from U.S. Appl. No. 13/082,319 (dated Apr. 3, 2013).
Nonfinal Office Action, U.S. Appl. No. 13/000,487 dated Sep. 6, 2012.
Nonfinal Office Action, U.S. Appl. No. 13/082,327, Bleecher et al. dated Dec. 21, 2012.
Office Action for U.S. Appl. No. 13/651,842 dated Jan. 10, 2013.
Office action for U.S. Appl. No. 12/562,920 dated Mar. 29, 2012.
Office Action, Chinese Patent Application No. 200980124417.6 dated Mar. 1, 2012.
Patent Owner Preliminary Response under 37 C.F.R. 42.107, dated Aug. 14, 2013.
Petition for Inter Partes Review of U.S. Pat. No. 8,286,561 under 35 U.S.C. §§ 311-319 and 37 C.F.R. § 42.100 et seq., filed before the Patent and Trial Board on Jun. 14, 2013.
Power of Attorney pursuant to 37 C.F.R. § 42.10(b) filed before the Patent and Trial Board on Jun. 14, 2013.
Prosecution history of European application No. EP06787306.7 (published as EP1902091) as of Sep. 3, 2009.
Sherwin-Williams Chemical Coatings product information for CC-E14, POLANE® 700T, water reducible enamel (May 2010).
Supplementary European Search Report, European Application No. 09771098 Completed date Dec. 9, 2011.
Third party opposition filed in corresponding European applicaton No. 09771098.2 (Dec. 5, 2011).
Two webpages re pigment particle size downloaded from the Internet at: <http://www.specialchem4coatings.com/tc/tio2/index.aspx?id=whiteness>, SpecialChem S.A. (printed on Sep. 3, 2013).
Uneiko Corporation, Rain Clear available at <http://web.archive.org/web/20070706032331/http:/www.rainclear.com/> (archived Jul. 6, 2007).
What's Hot in Beverage Centers, Kitchen & Bath Business, 56(7): 20-1 Aug. 2009.
What's Hot in Beverage Centers, Kitchen & Bath Business, vol. 56, No. 7, pp. 20-21, Aug. 2009.
Wolf, "Haier Heralds 08 Applicance Line in NYC" Dec. 3, 2007.
Zhang et al., Surface properties and gas permeability of Polybutadiene membrane treated with various fluorine containing gas plasmas, sen'i Gakkaishi, 47(12):635-43 (1991).
Zhang et al., Surface properties and gas permeability of Polybutadiene membrane treated with various fluorine containing gas plasmas, sen'i Gakkaishi, vol. 47, No. 12, pp. 635-643, (1991).
Nonfinal office action, U.S. Appl. No. 12/835,913, dated Jun. 14, 2013.
Final Office Action, U.S. Appl. No. 13/082,327, dated Sep. 23, 2013.

"Composition", in Collins English Dictionary (2000), viewed Aug. 26, 2013 from <http://www.credoreferences.com/entry/hcengdict/composition>.
Decision, Institution of Inter Partes Review 37 C.F.R. § 42.108, Schott Gemtron Corp. v. SSW Holding Co., Inc., Case IPR2013-00358, Paper No. 14, Nov. 4, 2013.
Decision, Institution of Inter Partes Review 37 C.F.R. § 42.108, Schott Gemtron Corp. v. SSW Holding Co., Inc., Case IPR2013-00358, Paper No. 14, Nov. 4, 2013, 20 pages.
First Office Action, Chinese patent application No. 201080036561.7, dated Nov. 28, 2013 [in Chinese with English translation].
Third Office Action, corresponding Chinese application No. 200980124417.6, dated Jan. 30, 2014 (in Chinese with English translation).
Trial No. IPR2013-00358, In re Inter Partes Review of U.S. Pat. No. 8,286,561,Notice of Filing Date Accorded to Petition and Time for Filing Patent Owner Preliminary Response (Jun. 20, 2013).
Trial No. IPR2013-00358, In re Inter Partes Review of U.S. Pat. No. 8,286,561, Amended Petition for Inter Partes Review of U.S. Pat. No. 8,286,561 under 35 U.S. C. 311-319 and 37 C.F.R. 42.100 et seq. (Jun. 21, 2013).
Trial No. IPR2013-00358, In re Inter Partes Review of U.S. Pat. No. 8,286,561, Notice of Accepting Corrected Petition (Jun. 24, 2013).
Trial No. IPR2013-00358, In re Inter Partes Review of U.S. Pat. No. 8,286,561, Mandatory Notices under 37 C.F.R. 42.8, Identification of the Real Party-in-Interest (Jun. 25, 2013).
Trial No. IPR2013-00358, In re Inter Partes Review of U.S. Pat. No. 8,286,561, Mandatory Notices under 37 C.F.R. 42.8, Identification of the Real Party-in-Interest (Jul. 8, 2013).
Trial No. IPR2013-00358, In re Inter Partes Review of U.S. Pat. No. 8,286,561, Order—Denial of Authorization to File Motion to Strike (Aug. 30, 2013).
Trial No. IPR2013-00358, In re Inter Partes Review of U.S. Pat. No. 8,286,561, Scheduling Order (Nov. 4, 2013).
Trial No. IPR2013-00358, In re Inter Partes Review of U.S. Pat. No. 8,286,561, Motion List for Initial Conference Call (Nov. 20, 2013).
Trial No. IPR2013-00358, In re Inter Partes Review of U.S. Pat. No. 8,286,561, Order—Conduct of the Proceeding (Nov. 26, 2013).
Trial No. IPR2013-00358, In re Inter Partes Review of U.S. Pat. No. 8,286,561, Additional Power of Attorney and Petitioner's Updated Mandatory Notices (Dec. 4, 2013).
Trial No. IPR2013-00358, In re Inter Partes Review of U.S. Pat. No. 8,286,561, Notice of Joint Stipulation to Modify Due Dates 1 and 2 of the Scheduling Order (Dec. 12, 2013).
Trial No. IPR2013-00358, In re Inter Partes Review of U.S. Pat. No. 8,286,561,Updated Notice of Lead and Back-Up Counsel (Jan. 7, 2014) and Corrected Updated Notice of Lead and Back-Up Counsel (Jan. 8, 2014).
Trial No. IPR2013-00358, In re Inter Partes Review of U.S. Pat. No. 8,286,561, Second Notice of Joint Stipulation to Modify Due Dates 1 and 2 of the Scheduling Order (Jan. 9, 2014).
Trial No. IPR2013-00358, In re Inter Partes Review of U.S. Pat. No. 8,286,561, Order—Authorization to File Motion for Additional Discovery (Jan. 13, 2014).
Trial No. IPR2013-00358, In re Inter Partes Review of U.S. Pat. No. 8,286,561, Notice of Deposition of Mr. Chris B. Schechter (Jan. 13, 2014).
Trial No. IPR2013-00358, In re Inter Partes Review of U.S. Pat. No. 8,286,561, Motion to File Under Seal (Motion for Additional Discovery) (Jan. 17, 2014).
Trial No. IPR2013-00358, In re Inter Partes Review of U.S. Pat. No. 8,286,561, Patent Owner's Motion for Additional Discovery (Redacted Version) (Jan. 17, 2014).
Trial No. IPR2013-00358, In re Inter Partes Review of U.S. Pat. No. 8,286,561, Transmittal Letter (of Schechter deposition) and Petitioner's Updated List of Exhibits (Jan. 24, 2014).
Trial No. IPR2013-00358, In re Inter Partes Review of U.S. Pat. No. 8,286,561, Petitioner's Opposition to Patent Owner's Motion for Additional Discovery (Jan. 24, 2014).
Trial No. IPR2013-00358, In re Inter Partes Review of U.S. Pat. No. 8,286,561, Third Notice of Joint Stipulation to Modify Due Dates 1 and 2 of the Scheduling Order (Jan. 28, 2014).

(56) References Cited

OTHER PUBLICATIONS

Trial No. IPR2013-00358, In re Inter Partes Review of U.S. Pat. No. 8,286,561, Order—Conduct of the Proceeding regarding Conference Call (Jan. 28, 2014).
Trial No. IPR2013-00358, In re Inter Partes Review of U.S. Pat. No. 8,286,561, Updated Notice of Lead and Back-Up Counsel (Feb. 4, 2014).
Trial No. IPR2013-00358, In re Inter Partes Review of U.S. Pat. No. 8,286,561, Patent Owner's Motion to File Under Seal (Patent Owner Response) (Feb. 7, 2014).
Trial No. IPR2013-00358, In re Inter Partes Review of U.S. Pat. No. 8,286,561, Patent Owner's Updated List of Exhibits (Feb. 7, 2014).
Trial No. IPR2013-00358, In re Inter Partes Review of U.S. Pat. No. 8,286,561, Decision—Patent Owner's Motion for Additional Discovery (Feb. 14, 2014).
Trial No. IPR2013-00358, In re Inter Partes Review of U.S. Pat. No. 8,286,561, Order—Conduct of the Proceeding regarding Conference Call (Feb. 24, 2014).
Trial No. IPR2013-00358, In re Inter Partes Review of U.S. Pat. No. 8,286,561, Patent Owner's Notice of Withdrawal of Motion to Seal, Submission of Replacement Papers, and Request to Expunge (Feb. 27, 2014).
Trial No. IPR2013-00358, In re Inter Partes Review of U.S. Pat. No. 8,286,561, Patent Owner Response to the Amended Petition for Inter Partes Review and the Decision Institution of Inter Partes Review (Feb. 27, 2014).
Trial No. IPR2013-00358, In re Inter Partes Review of U.S. Pat. No. 8,286,561, Order—Conduct of the Proceeding (Mar. 4, 2014).
Trial No. IPR2013-00358, In re Inter Partes Review of U.S. Pat. No. 8,286,561, Notice of Deposition of Richard B. Mills (Mar. 10, 2014).
Trial No. IPR2013-00358, In re Inter Partes Review of U.S. Pat. No. 8,286,561, Notice of Deposition of Paul Saunders (Mar. 10, 2014).
Trial No. IPR2013-00358, In re Inter Partes Review of U.S. Pat. No. 8,286,561, Notice of Deposition of John Driver (Mar. 10, 2014).
Trial No. IPR2013-00358, In re Inter Partes Review of U.S. Pat. No. 8,286,561, Notice of Deposition of Bradley M. Nall (Mar. 10, 2014).
Trial No. IPR2013-00358, In re Inter Partes Review of U.S. Pat. No. 8,286,561, Order—Conduct of the Proceeding regarding Conference Call (Mar. 20, 2014).
Trial No. IPR2013-00358, In re Inter Partes Review of U.S. Pat. No. 8,286,561, Transmittal to Board and Petitioner's Updated List of Exhibits (Mar. 24, 2014).
Trial No. IPR2013-00358, In re Inter Partes Review of U.S. Pat. No. 8,286,561, Order—Conduct of the Proceeding regarding Conference Call (Mar. 25, 2014).
Trial No. IPR2013-00358, In re Inter Partes Review of U.S. Pat. No. 8,286,561, Second Notice of Deposition of Paul Saunders (Apr. 10, 2014).
Trial No. IPR2013-00358, In re Inter Partes Review of U.S. Pat. No. 8,286,561, Order—Conduct of the Proceeding regarding conference call (Apr. 21, 2014).
Trial No. IPR2013-00358, In re Inter Partes Review of U.S. Pat. No. 8,286,561, Patent Owner's Notice of Filing of Exhibits 2062 and 2063, along with Patent Owner's Updated List of Exhibits (Apr. 22, 2014).
Trial No. IPR2013-00358, In re Inter Partes Review of U.S. Pat. No. 8,286,561, Petitioner's Reply to Patent Owner's Response to Petition, along with Petitioner's Updated Exhibit List (Apr. 22, 2014).
Trial No. IPR2013-00358, In re Inter Partes Review of U.S. Pat. No. 8,286,561, Petitioner's Motion for Additional Discovery, Public Version (Apr. 25, 2014).
Trial No. IPR2013-00358, In re Inter Partes Review of U.S. Pat. No. 8,286,561, Patent Owner's Motion to Seal (Exhibits 2062 and 2063), along with Patent Owner's Updated Exhibit List (Apr. 25, 2014).
Trial No. IPR2013-00358, In re Inter Partes Review of U.S. Pat. No. 8,286,561, Petitioner's Updated List of Exhibits (Apr. 25, 2014).
Trial No. IPR2013-00358, In re Inter Partes Review of U.S. Pat. No. 8,286,561, Patent Owner's Opposition to Petitioner's Motion for Additional Discovery (Public Redacted Version), along with Patent Owner's Updated List of Exhibits (May 2, 2014).
Trial No. IPR2013-00358, In re Inter Partes Review of U.S. Pat. No. 8,286,561, Petitioner's Opposition to Patent Owner's Motion to Seal (Exhibits 2062 and 2063), along with Petitioner's Updated Exhibit List (May 2, 2014).
Trial No. IPR2013-00358, In re Inter Partes Review of U.S. Pat. No. 8,286,561, Patent Owner's Motion to Expunge (Papers filed Apr. 21, 2014) (May 9, 2014).
Trial No. IPR2013-00358, In re Inter Partes Review of U.S. Pat. No. 8,286,561, Decision Motions to Seal (May 16, 2014).
Trial No. IPR2013-00358, In re Inter Partes Review of U.S. Pat. No. 8,286,561, Order—Conduct of the Proceeding regarding May 8, 2014, conference call (May 16, 2014).
Trial No. IPR2013-00358, In re Inter Partes Review of U.S. Pat. No. 8,286,561, Decision—Motion for Additional Discovery (May 16, 2014).
Trial No. IPR2013-00358, In re Inter Partes Review of U.S. Pat. No. 8,286,561, Notice of Filing Executed Protective Order (Exhibit 2068), Notice of Filing Exhibits 2066 and 2067 and Patent Owner's Updated List of Exhibits (May 19, 2014).
Trial No. IPR2013-00358, In re Inter Partes Review of U.S. Pat. No. 8,286,561, Patent Owner's Motion to Seal (Paper 62) (May 21, 2014).
Trial No. IPR2013-00358, In re Inter Partes Review of U.S. Pat. No. 8,286,561, Patent Owner's Motion to Expunge (Papers 65, 70 and Exhibits 1021, 1022), along with Patent Owner's Request for Oral Argument (May 22, 2014).
Trial No. IPR2013-00358, In re Inter Partes Review of U.S. Pat. No. 8,286,561, Petitioner's Statement Regarding Oral Argument, Petitioner's Motion to Exclude Evidence, Petitioner's Motion to Seal Conditionally Exhibits 2069 and 2073 and Petitioner's Motion to Exclude Evidence, and Petitioner's Updated List of Exhibits (May 22, 2014).
Trial No. IPR2013-00358, In re Inter Partes Review of U.S. Pat. No. 8,286,561, Exhibit 1001 (U.S. Pat. No. 8,286,561), filed with the Patent Trial and Appeal Board Jun. 14, 2013.
Trial No. IPR2013-00358, In re Inter Partes Review of U.S. Pat. No. 8,286,561, Exhibit 1002 (U.S. Appl. No. 61/133,273), filed with the Patent Trial and Appeal Board Jun. 14, 2013.
Trial No. IPR2013-00358, In re Inter Partes Review of U.S. Pat. No. 8,286,561, Exhibit 1003 (U.S. Appl. No. 61/216,540), filed with the Patent Trial and Appeal Board Jun. 14, 2013.
Trial No. IPR2013-00358, In re Inter Partes Review of U.S. Pat. No. 8,286,561, Exhibit 1004 (WIPO Patent Publication No. 2009/158567), filed with the Patent Trial and Appeal Board Jun. 14, 2013.
Trial No. IPR2013-00358, In re Inter Partes Review of U.S. Pat. No. 8,286,561, Exhibit 1005 (U.S. Pat. No. 5,948,685), filed with the Patent Trial and Appeal Board Jun. 14, 2013.
Trial No. IPR2013-00358, In re Inter Partes Review of U.S. Pat. No. 8,286,561, Exhibit 1006 (U.S. Pat. No. 6,352,758), filed with the Patent Trial and Appeal Board Jun. 14, 2013.
Trial No. IPR2013-00358, In re Inter Partes Review of U.S. Pat. No. 8,286,561, Exhibit 1007 (U.S. Pat. No. 6,872,441), filed with the Patent Trial and Appeal Board Jun. 14, 2013.
Trial No. IPR2013-00358, In re Inter Partes Review of U.S. Pat. No. 8,286,561, Exhibit 1008 (US Publication No. 2012/0009396), filed with the Patent Trial and Appeal Board Jun. 14, 2013.
Trial No. IPR2013-00358, In re Inter Partes Review of U.S. Pat. No. 8,286,561, Exhibit 1009 (WIPO Publication No. WO2006/044641), filed with the Patent Trial and Appeal Board Jun. 14, 2013.
Trial No. IPR2013-00358, In re Inter Partes Review of U.S. Pat. No. 8,286,561, Exhibit 1010 (Declaration of Chris B. Schechter), filed with the Patent Trial and Appeal Board Jun. 14, 2013.
Trial No. IPR2013-00358, In re Inter Partes Review of U.S. Pat. No. 8,286,561, Exhibit 1011 (Transcript of Chris B. Schechter Deposition on Jan. 23, 2014), filed with the Patent Trial and Appeal Board Jan. 24, 2014.
Trial No. IPR2013-00358, In re Inter Partes Review of U.S. Pat. No. 8,286,561, Exhibit 1012 (U.S. Pat. No. 5,966,874), filed with the Patent Trial and Appeal Board Apr. 22, 2014.

(56) References Cited

OTHER PUBLICATIONS

Trial No. IPR2013-00358, In re Inter Partes Review of U.S. Pat. No. 8,286,561, Exhibit 1015 (Transcript of Paul Saunders Deposition on Mar. 20, 2014), filed with the Patent Trial and Appeal Board on Mar. 24, 2014.
Trial No. IPR2013-00358, In re Inter Partes Review of U.S. Pat. No. 8,286,561, Exhibit 1017 (Transcript of Richard Bruce Mills Deposition on Mar. 19, 2014), filed with the Patent Trial and Appeal Board on Apr. 22, 2014.
Trial No. IPR2013-00358, In re Inter Partes Review of U.S. Pat. No. 8,286,561, Exhibit 1018 (Transcript of Paul Saunders Deposition on Apr. 11, 2014), filed with the Patent Trial and Appeal Board on Apr. 22, 2014.
Trial No. IPR2013-00358, In re Inter Partes Review of U.S. Pat. No. 8,286,561, Exhibit 1019 (Petitioner's Objections to Evidence), filed with the Patent Trial and Appeal Board on Apr. 25, 2014.
Trial No. IPR2013-00358, In re Inter Partes Review of U.S. Pat. No. 8,286,561, Exhibit 1020 (Patent Owner's Notice of Service of Supplemental Evidence in Response to Objections to Evidence served on Mar. 4, 2014), filed with the Patent Trial and Appeal Board on Apr. 25, 2014.
Trial No. IPR2013-00358, In re Inter Partes Review of U.S. Pat. No. 8,286,561, Exhibit 1023 (Petitioner's Proposed Protective Order), filed with the Patent Trial and Appeal Board on May 2, 2014.
Trial No. IPR2013-00358, In re Inter Partes Review of U.S. Pat. No. 8,286,561, Exhibit 1024 (Redline of Petitioner's Proposed Protective Order), filed with the Patent Trial and Appeal Board on May 2, 2014.
Trial No. IPR2013-00358, In re Inter Partes Review of U.S. Pat. No. 8,286,561, Exhibit 1025 (Petitioner's Objections to Evidence served on Jan. 28, 2014), filed with the Patent Trial and Appeal Board on May 22, 2014.
Trial No. IPR2013-00358, In re Inter Partes Review of U.S. Pat. No. 8,286,561, Exhibit 1026(Petitioner's Objections to Evidence served on Feb. 18, 2014), filed with the Patent Trial and Appeal Board on May 22, 2014.
Trial No. IPR2013-00358, In re Inter Partes Review of U.S. Pat. No. 8,286,561, Exhibit 1027 (Petitioner's Objections to Evidence served on Mar. 7, 2014), filed with the Patent Trial and Appeal Board on May 22, 2014.
Trial No. IPR2013-00358, In re Inter Partes Review of U.S. Pat. No. 8,286,561, Exhibit 2001 (Publicly available employment history for Chris Schechter), filed with the Patent Trial and Appeal Board on Aug. 14, 2013.
Trial No. IPR2013-00358, In re Inter Partes Review of U.S. Pat. No. 8,286,561, Exhibit 2002 (Definition of "Shelf" from Merriam Webster's Dictionary, 11th edition, 2006), filed with the Patent Trial and Appeal Board on Aug. 14, 2013.
Trial No. IPR2013-00358, In re Inter Partes Review of U.S. Pat. No. 8,286,561, Exhibit 2003 (Definition of "Spill" from Merriam Webster's Dictionary, 11th edition,2006), filed with the Patent Trial and Appeal Board on Aug. 14, 2013.
Trial No. IPR2013-00358, In re Inter Partes Review of U.S. Pat. No. 8,286,561, Exhibit 2004 (Declaration of Bradley M. Nall, Redacted Version, Jan. 17, 2014), filed with the Patent Trial and Appeal Board on Jan. 17, 2014.
Trial No. IPR2013-00358, In re Inter Partes Review of U.S. Pat. No. 8,286,561, Exhibit 2005 (Declaration of Richard Bruce Mills, Jan. 16, 2014), filed with the Patent Trial and Appeal Board on Jan. 17, 2014.
Trial No. IPR2013-00358, In re Inter Partes Review of U.S. Pat. No. 8,286,561, Exhibit 2006 (Whirlpool 2012 Annual Report), filed with the Patent Trial and Appeal Board on Jan. 17, 2014.
Trial No. IPR2013-00358, In re Inter Partes Review of U.S. Pat. No. 8,286,561, Exhibit 2007(Whirlpool Catalog Summer 2010), filed with the Patent Trial and Appeal Board on Jan. 17, 2014.
Trial No. IPR2013-00358, In re Inter Partes Review of U.S. Pat. No. 8,286,561, Exhibit 2008 (Whirlpool press release IBS 2010), filed with the Patent Trial and Appeal Board on Jan. 17, 2014.
Trial No. IPR2013-00358, In re Inter Partes Review of U.S. Pat. No. 8,286,561, Exhibit 2009 (Whirlpool press release Jan. 20, 2010), filed with the Patent Trial and Appeal Board on Jan. 17, 2014.
Trial No. IPR2013-00358, In re Inter Partes Review of U.S. Pat. No. 8,286,561, Exhibit 2010 (Whirlpool press release Jul. 26, 2011), filed with the Patent Trial and Appeal Board on Jan. 17, 2014.
Trial No. IPR2013-00358, In re Inter Partes Review of U.S. Pat. No. 8,286,561, Exhibit 2011 (Whirlpool press release Oct. 7, 2013), filed with the Patent Trial and Appeal Board on Jan. 17, 2014.
Trial No. IPR2013-00358, In re Inter Partes Review of U.S. Pat. No. 8,286,561, Exhibit 2012 (Whirlpool press release Second-Quarter 2010 Results), filed with the Patent Trial and Appeal Board on Jan. 17, 2014.
Trial No. IPR2013-00358, In re Inter Partes Review of U.S. Pat. No. 8,286,561, Exhibit 2013 (consumer reviews published on Whirlpool.com website), filed with the Patent Trial and Appeal Board on Jan. 17, 2014.
Trial No. IPR2013-00358, In re Inter Partes Review of U.S. Pat. No. 8,286,561, Exhibit 2014 ("Why Won't Anyone Clean Me?" The Wall Street Journal, Feb. 24, 2010), filed with the Patent Trial and Appeal Board on Jan. 17, 2014.
Trial No. IPR2013-00358, In re Inter Partes Review of U.S. Pat. No. 8,286,561, Exhibit 2015 (International Builders' Show Product Review: Whirlpool Gold GSS26C4XXY Side-by-Side with MicroEtch Spill Control Shelves, Consumer Reports, Jan. 20, 2010), filed with the Patent Trial and Appeal Board on Jan. 17, 2014.
Trial No. IPR2013-00358, In re Inter Partes Review of U.S. Pat. No. 8,286,561, Exhibit 2016 (Who Moved My (Moldy) Cheese?, Eating Well, Aug. 2013), filed with the Patent Trial and Appeal Board on Jan. 17, 2014.
Trial No. IPR2013-00358, In re Inter Partes Review of U.S. Pat. No. 8,286,561, Exhibit 2017 (U.S. Pat. No. 5,429,433), filed with the Patent Trial and Appeal Board on Feb. 7, 2014.
Trial No. IPR2013-00358, In re Inter Partes Review of U.S. Pat. No. 8,286,561, Exhibit 2018 (U.S. Pat. No. 6,422,673), filed with the Patent Trial and Appeal Board on Feb. 7, 2014.
Trial No. IPR2013-00358, In re Inter Partes Review of U.S. Pat. No. 8,286,561, Exhibit 2019 (U.S. Pat. No. 6,679,573), filed with the Patent Trial and Appeal Board on Feb. 7, 2014.
Trial No. IPR2013-00358, In re Inter Partes Review of U.S. Pat. No. 8,286,561, Exhibit 2020 (Second Declaration of Bradley M. Nall, Feb. 6, 2014), filed with the Patent Trial and Appeal Board on Feb. 27, 2014.
Trial No. IPR2013-00358, In re Inter Partes Review of U.S. Pat. No. 8,286,561, Exhibit 2021 (Declaration of John Driver), filed with the Patent Trial and Appeal Board on Feb. 27, 2014.
Trial No. IPR2013-00358, In re Inter Partes Review of U.S. Pat. No. 8,286,561, Exhibit 2022 (Second Declaration of Richard Bruce Mills), filed with the Patent Trial and Appeal Board on Feb. 7, 2014.
Trial No. IPR2013-00358, In re Inter Partes Review of U.S. Pat. No. 8,286,561, Exhibit 2023 (Resume of Bruce Mills), filed with the Patent Trial and Appeal Board on Feb. 7, 2014.
Trial No. IPR2013-00358, In re Inter Partes Review of U.S. Pat. No. 8,286,561, Exhibit 2024 (Declaration of Paul Saunders, Jan. 22, 2014), filed with the Patent Trial and Appeal Board on Feb. 7, 2014.
Trial No. IPR2013-00358, In re Inter Partes Review of U.S. Pat. No. 8,286,561, Exhibit 2025 (Samples of Whirlpool website advertising), filed with the Patent Trial and Appeal Board on Feb. 7, 2014.
Trial No. IPR2013-00358, In re Inter Partes Review of U.S. Pat. No. 8,286,561, Exhibit 2026 (Hydrophobic shelf presentation, dated Oct. 27, 2008), filed with the Patent Trial and Appeal Board on Feb. 27, 2014.
Trial No. IPR2013-00358, In re Inter Partes Review of U.S. Pat. No. 8,286,561, Exhibit 2027 (Request for quote, dated Oct. 30, 2008), filed with the Patent Trial and Appeal Board on Feb. 27, 2014.
Trial No. IPR2013-00358, In re Inter Partes Review of U.S. Pat. No. 8,286,561, Exhibit 2028 (Hydrophobic shelf presentation and related email, dated Mar. 13, 2009), filed with the Patent Trial and Appeal Board on Feb. 27, 2014.
Trial No. IPR2013-00358, In re Inter Partes Review of U.S. Pat. No. 8,286,561, Exhibit 2029 (Hydrophobic/frit shelf presentation, dated May 19, 2009) filed with the Patent Trial and Appeal Board on Feb. 27, 2014.

(56) References Cited

OTHER PUBLICATIONS

Trial No. IPR2013-00358, In re Inter Partes Review of U.S. Pat. No. 8,286,561, Exhibit 2030 (Hydrophobic shelf drawing specfication and related email, dated May 21, 2009), filed with the Patent Trial and Appeal Board on Feb. 27, 2014.
Trial No. IPR2013-00358, In re Inter Partes Review of U.S. Pat. No. 8,286,561, Exhibit 2031 (Hydrophob shelf drawing specfication and related email, May 22, 2009), filed with the Patent Trial and Appeal Board on Feb. 27, 2014.
Trial No. IPR2013-00358, In re Inter Partes Review of U.S. Pat. No. 8,286,561, Exhibit 2032 (Hydrophobic shelf drawing specification, Jun. 30, 2009, SSW Holding Company), filed with the Patent Trial and Appeal Board on Feb. 27, 2014.
Trial No. IPR2013-00358, In re Inter Partes Review of U.S. Pat. No. 8,286,561, Exhibit 2033 (Hydrophobic shelf drawing specficiation, Feb. 28, 2011), filed with the Patent Trial and Appeal Board on Feb. 27, 2014.
Trial No. IPR2013-00358, In re Inter Partes Review of U.S. Pat. No. 8,286,561, Exhibit 2034 (SSW Holding Company, Inc. Nano Shelf Sales 2010-2013), filed with the Patent Trial and Appeal Board on Feb. 27, 2014.
Trial No. IPR2013-00358, In re Inter Partes Review of U.S. Pat. No. 8,286,561, Exhibit 2035 (SSW Holding Company, Inc., Nano Shelf Forecasted Sales 2014-2015), filed with the Patent Trial and Appeal Board on Feb. 27, 2014.
Trial No. IPR2013-00358, In re Inter Partes Review of U.S. Pat. No. 8,286,561, Exhibit 2036 (Detailed data relative to SSW Holding Company's 2014 sales), filed with the Patent Trial and Appeal Board on Feb. 27, 2014.
Trial No. IPR2013-00358, In re Inter Partes Review of U.S. Pat. No. 8,286,561, Exhibit 2037 (Schott Gemtron nano Shelf Sales 2010-2013), filed with the Patent Trial and Appeal Board on Feb. 27, 2014.
Trial No. IPR2013-00358, In re Inter Partes Review of U.S. Pat. No. 8,286,561, Exhibit 2038 (Schott Gemtron Nano Shelf Forecasted Sales 2014-2015), filed with the Patent Trial and Appeal Board on Feb. 27, 2014.
Trial No. IPR2013-00358, In re Inter Partes Review of U.S. Pat. No. 8,286,561, Exhibit 2039 (U.S. Refrigerator Industry Shipments), filed with the Patent Trial and Appeal Board on Feb. 27, 2014.
Trial No. IPR2013-00358, In re Inter Partes Review of U.S. Pat. No. 8,286,561, Exhibit 2040 (Forecasts and Shipments, Appliance Design, Oct. 2012), filed with the Patent Trial and Appeal Board on Feb. 27, 2014.
Trial No. IPR2013-00358, In re Inter Partes Review of U.S. Pat. No. 8,286,561, Exhibit 2041 (Forecasts and shipments, Appliance Design, Jan. 2014), filed with the Patent Trial and Appeal Board on Feb. 27, 2014.
Trial No. IPR2013-00358, In re Inter Partes Review of U.S. Pat. No. 8,286,561, Exhibit 2042 (SSW Holding Company, Inc. Nano US Market Share 2010-2013), filed with the Patent Trial and Appeal Board on Feb. 27, 2014.
Trial No. IPR2013-00358, In re Inter Partes Review of U.S. Pat. No. 8,286,561, Exhibit 2043 (SSW Holding Company, Inc. Nano US Market Share Forecast 2014-2015), filed with the Patent Trial and Appeal Board on Feb. 27, 2014.
Trial No. IPR2013-00358, In re Inter Partes Review of U.S. Pat. No. 8,286,561, Exhibit 2044 (SSW Holding Company, Inc. & Schott Gemtron Nano US Market Share 2010-2013), filed with the Patent Trial and Appeal Board on Feb. 27, 2014.
Trial No. IPR2013-00358, In re Inter Partes Review of U.S. Pat. No. 8,286,561, Exhibit 2045 (SSW Holding Company, Inc. & Schott Gemtron Nano US Market Share Forecast 2014-2015), filed with the Patent Trial and Appeal Board on Feb. 27, 2014.
Trial No. IPR2013-00358, In re Inter Partes Review of U.S. Pat. No. 8,286,561, Exhibit 2046 (SSW Holding Company, Inc. & Schott Gemtron Nano US Market Share Forecast 2010-2015), filed with the Patent Trial and Appeal Board on Feb. 27, 2014.
Trial No. IPR2013-00358, In re Inter Partes Review of U.S. Pat. No. 8,286,561, Exhibit 2047 (Brad Nall credit card statement and expense report purchasing Gemtron hydrophobic shelves from Sears, Oct. 22, 2012), filed with the Patent Trial and Appeal Board on Feb. 27, 2014.
Trial No. IPR2013-00358, In re Inter Partes Review of U.S. Pat. No. 8,286,561, Exhibit 2048 (Resumed deposition of Christopher B. Schechter, Jan. 29, 2014), filed with the Patent Trial and Appeal Board on Feb. 27, 2014.
Trial No. IPR2013-00358, In re Inter Partes Review of U.S. Pat. No. 8,286,561, Exhibit 2049 (Samples of Sub-Zero website advertising), filed with the Patent Trial and Appeal Board on Feb. 27, 2014.
Trial No. IPR2013-00358, In re Inter Partes Review of U.S. Pat. No. 8,286,561, Exhibit 2050 (Samples of Viking marketing materials), filed with the Patent Trial and Appeal Board on Feb. 27, 2014.
Trial No. IPR2013-00358, In re Inter Partes Review of U.S. Pat. No. 8,286,561, Exhibit 2051 (Emailrelaying effusive praise from customer CEO, May 7, 2010.), filed with the Patent Trial and Appeal Board on Feb. 27, 2014.
Trial No. IPR2013-00358, In re Inter Partes Review of U.S. Pat. No. 8,286,561, Exhibit 2052 (Merriam-Webster Dictionary, definition of "Transparent", 2006), filed with the Patent Trial and Appeal Board on Feb. 7, 2014.
Trial No. IPR2013-00358, In re Inter Partes Review of U.S. Pat. No. 8,286,561, Exhibit 2053 (detailed data relative to SSW's 2015 sales), filed with the Patent Trial and Appeal Board on Feb. 27, 2014.
Trial No. IPR2013-00358, In re Inter Partes Review of U.S. Pat. No. 8,286,561, Exhibit 2054 Third Declaration of Richard Bruce Mills, Mar. 3, 2014), filed with the Patent Trial and Appeal Board on May 22, 2014.
Trial No. IPR2013-00358, In re Inter Partes Review of U.S. Pat. No. 8,286,561, Exhibit 2056 Third Declaration of Bradley M. Nall, Mar. 4, 2014), filed with the Patent Trial and Appeal Board on Apr. 25, 2014.
Trial No. IPR2013-00358, In re Inter Partes Review of U.S. Pat. No. 8,286,561, Exhibit 2057 (SSW Holding Company's BPCS Data, submitted to Petitioner by Patent Owner), filed with the Patent Trial and Appeal Board on Apr. 22, 2014.
Trial No. IPR2013-00358, In re Inter Partes Review of U.S. Pat. No. 8,286,561, Exhibit 2058 (customer demand release schedule), filed with the Patent Trial and Appeal Board on May 2, 2014.
Trial No. IPR2013-00358, In re Inter Partes Review of U.S. Pat. No. 8,286,561, Exhibit 2059 (Whirlpool communication concerning 2014 capacity), filed with the Patent Trial and Appeal Board on Apr. 22, 2014.
Trial No. IPR2013-00358, In re Inter Partes Review of U.S. Pat. No. 8,286,561, Exhibit 2064 (Stipulated Protective Order from Patent Owner, clean version, Apr. 2014), filed with the Patent Trial and Appeal Board on Apr. 25, 2014.
Trial No. IPR2013-00358, In re Inter Partes Review of U.S. Pat. No. 8,286,561, Exhibit 2065 (Stipulated Protective Order from Patent Owner, redlined version, Apr. 2014), filed with the Patent Trial and Appeal Board on Apr. 25, 2014.
Trial No. IPR2013-00358, In re Inter Partes Review of U.S. Pat. No. 8,286,561, Exhibit 2066 (Redacted Exhibit 2062, Depostion of John P. Driver, Mar. 25, 2014), filed with the Patent Trial and Appeal Board on Apr. 22, 2014.
Trial No. IPR2013-00358, In re Inter Partes Review of U.S. Pat. No. 8,286,561, Exhibit 2067 (Redacted Exhibit 2063, Depostion of Bradley M. Nall, Mar. 26, 2014), filed with the Patent Trial and Appeal Board on Apr. 22, 2014.
Trial No. IPR2013-00358, In re Inter Partes Review of U.S. Pat. No. 8,286,561, Exhibit 2068 (Executed Protective Order), filed with the Patent Trial and Appeal Board on May 19, 2014.
Trial No. IPR2014-00367, In re Inter Partes Review of U.S. Pat. No. 8,286,561, Petition for Inter Partes Review of U.S. Pat. No. 8,286,561 filed with the Patent Trial and Appeal Board on Jan. 18, 2014.
Trial No. IPR2014-00367, In re Inter Partes Review of U.S. Pat. No. 8,286,561, Power of Attorney, filed with the Patent Trial and Appeal Board on Jan. 17, 2014.

(56) References Cited

OTHER PUBLICATIONS

Trial No. IPR2014-00367, In re Inter Partes Review of U.S. Pat. No. 8,286,561, Notice of Filing Date According to Petition and Time for Filing Patent Owner Preliminary Response, mailed Jan. 29, 2014.

Trial No. IPR2014-00367, In re Inter Partes Review of U.S. Pat. No. 8,286,561, Mandatory Notices under 37 C.F.R. § 42.8—Identification of the Real Party-in-Interest (Feb. 7, 2014).

Trial No. IPR2014-00367, In re Inter Partes Review of U.S. Pat. No. 8,286,561, Patent Owner's Preliminary Response (Apr. 29, 2014).

Trial No. IPR2014-00367, In re Inter Partes Review of U.S. Pat. No. 8,286,561, Exhibit 1101—U.S. Pat. No. 8,286,561, filed with the Patent and Trial Appeal Board on Jan. 18, 2014.

Trial No. IPR2014-00367, In re Inter Partes Review of U.S. Pat. No. 8,286,561, Exhibit 1102—U.S. Appl. No. 61/133,276, filed with the Patent and Trial Appeal Board on Jan. 18, 2014.

Trial No. IPR2014-00367, In re Inter Partes Review of U.S. Pat. No. 8,286,561, Exhibit 1103 - U.S. Provisional Patent Application No. 61/216,540, filed with the Patent and Trial Appeal Board on Jan. 18, 2014.

Trial No. IPR2014-00367, In re Inter Partes Review of U.S. Pat. No. 8,286,561, Exhibit 1104—WIPO Patent Publication No. WO2009/158567, filed with the Patent and Trial Appeal Board on Jan. 18, 2014.

Trial No. IPR2014-00367, In re Inter Partes Review of U.S. Pat. No. 8,286,561, Exhibit 1105—U.S. Pat. No. 5,948,685, filed with the Patent and Trial Appeal Board on Jan. 18, 2014.

Trial No. IPR2014-00367, In re Inter Partes Review of U.S. Pat. No. 8,286,561, Exhibit 1106—U.S. Pat. No. 6,872,441, filed with the Patent and Trial Appeal Board on Jan. 18, 2014.

Trial No. IPR2014-00367, In re Inter Partes Review of U.S. Pat. No. 8,286,561, Exhibit 1107—U.S. Patent Publication No. 2012/0009396, filed with the Patent and Trial Appeal Board on Jan. 18, 2014.

Trial No. IPR2014-00367, In re Inter Partes Review of U.S. Pat. No. 8,286,561, Exhibit 1108—WIPO Patent Publication No. WO 2006/044641, filed with the Patent and Trial Appeal Board on Jan. 18, 2014.

Trial No. IPR2014-00367, In re Inter Partes Review of U.S. Pat. No. 8,286,561, Corrected Exhibit 1109—Declaration of Chris B. Schecter, filed with the Patent and Trial Appeal Board on Jan. 21, 2014.

Trial No. IPR2013-00358, In re Inter Partes Review of U.S. Pat. No. 8,286,561, Redacted Public Version, Patent Owner's Opposition to Petitioner's Motion to Exclude Evidence, filed with the Patent and Trial Appeal Board on Jun. 5, 2014.

Trial No. IPR2013-00358, In re Inter Partes Review of U.S. Pat. No. 8,286,561, Redacted Public Version, Patent Owner's Motion to Seal (Patent Owner's Opposition to Petitioner's Motion to Exclude Evidence), filed with the Patent and Trial Appeal Board on Jun. 5, 2014.

Trial No. IPR2014-00367, In re Inter Partes Review of U.S. Pat. No. 8,286,561, Decision: Institution of Inter Partes Review (Jun. 11, 2014).

Trial No. IPR2013-00358, In re Inter Partes Review of U.S. Pat. No. 8,286,561, Oral Hearing Before the Patent Trial and Appeal Board (Jun. 23, 2014).

European Search Report for European Application No. EP0981951.8, dated Jul. 22, 20014, 12 pages.

Trial No. IPR2013-00358, In re Inter Partes Review of U.S. Pat. No. 8,286,561, Final Written Opinion (Aug. 20, 2014).

Nonfinal office action, U.S. Appl. No. 13/082,319, dated Sep. 22, 2014.

Nonfinal office action, U.S. Appl. No. 13/082,327, dated Sep. 19, 2014.

Final Office Action, U.S. Appl. No. 13/082,327, dated Oct. 24, 2014.

Nonfinal Office Action, U.S. Appl. No. 13/661,615, dated Jun. 3, 2015.

Handique et al., Microfluidic flow control using selective hydrophobic patterning, SPIE, 3224:185-95 (1997).

Picken, Alan D., U.S. Appl. No. 60/619,087, dated Oct. 15, 2004.

Picken, Alan D., U.S. Appl. No. 60/707,623, dated Aug. 12, 2005.

Stains allowed to dry for 72 hrs

After cleaning with wet dish rag

SPILL CONTAINING REFRIGERATOR SHELF ASSEMBLY

CROSS-REFERENCE TO RELATED APPLICATIONS

This is a continuation of U.S. Ser. No. 14/921,322, filed Oct. 23, 2015, which is a continuation of U.S. patent application Ser. No. 14/463,469, filed Aug. 19, 2014, which is a continuation of U.S. patent application Ser. No. 13/891,954, filed May 10, 2013, which is a continuation of U.S. patent application Ser. No. 13/651,842, filed Oct. 15, 2012, which is a continuation of U.S. patent application Ser. No. 12/562,920, filed Sep. 18, 2009, which is a continuation-in-part of International Patent Application No. PCT/US09/48775, filed Jun. 26, 2009, which claims priority to U.S. Provisional Patent Application No. 61/216,540, filed May 18, 2009, and U.S. Provisional Patent Application No. 61/133,273, filed Jun. 27, 2008. U.S. patent application Ser. No. 13/651,842 is also a continuation-in-part application of U.S. patent application Ser. No. 13/000,487, which is a U.S. national stage application of International Patent Application No. PCT/US09/48775, filed Jun. 26, 2009, which as described above claims priority to U.S. Provisional Patent Application No. 61/216,540, filed May 18, 2009, and U.S. Provisional Patent Application No. 61/133,273, filed Jun. 27, 2008. The entire contents of each of the foregoing applications is expressly incorporated herein by reference.

FIELD OF THE INVENTION

The invention relates to shelving and the like, e.g., countertops and table tops, including shelving which may be adapted for use with refrigerators. More particularly, the invention relates to the support surfaces of such articles which have spill containing features.

BACKGROUND ART

Previous types of shelving have been developed for use as refrigerator and other shelves. Shelving designs exist in the prior art which include means for containing liquid spills and leaks from a container stored on a shelf, and preventing the spill from dripping from the shelf onto the floor or into other parts of a refrigerator, commonly referred to as "spill proof" shelving. For example, Kane, et al., U.S. Pat. No. 5,564,809, issued Oct. 14, 1996, discloses a shelf assembly with a shelf panel, a shelf support supporting the panel, and a molded one-piece member encapsulating the edge of the shelf panel and a substantial majority of the shelf support.

Herrmann, et al., U.S. Pat. No. 5,735,589, issued Apr. 7, 1998, discloses a shelf panel for a refrigerator compartment, which includes a shelf panel that is slidably supported for extension and retraction on a support, and which includes slide members that are preferably molded so as to form a rim on the top support surface of the shelf panel to contain liquids.

Bird, et al., U.S. Pat. No. 5,429,433, issued Jul. 4, 1995, also describes a refrigerator shelf which is adapted for containment of spills on the shelf. The shelf includes a planar shelf with a rim molded around the perimeter edge of the shelf. The rim projects above the top surface of the shelf to form a dam for containing liquid spills on the shelf.

Meier, et al., U.S. Pat. No. 6,120,720, issued Sep. 19, 2000, discloses a method of manufacturing a glass shelf with a plastic edge for retaining spills on the shelf. The glass shelf panel is placed in a cavity of a mold and plastic material is injected into the cavity surrounding the glass shelf panel such that a plastic edging is formed around the perimeter of the glass shelf panel.

Additional techniques for containing spills in refrigerator shelving include the use of injection molded plastic, so as to encapsulate a support plate forming the shelf, using plastic molded parts to essentially "sandwich" a support plate between the parts, or using a silicone sealant or various other types of adhesives to form physical spill containment barriers around the perimeter of the refrigerator shelving. In addition to the foregoing, it is known to utilize formed lips or ridges on the surface of the support plate itself, so as to essentially provide a physical barrier as a liquid retention feature.

SUMMARY OF THE INVENTION

The present invention is a method for containing spills on shelving and the like having a support top surface, and the resulting items made in accordance with the method, by providing the support top surface with a hydrophobic surface which is arranged in a spill containment pattern and which is generally in the plane of the top surface of the support. The majority of the top surface of the support consists of one or more spill containment areas which are of a non-hydrophobic nature and which are bounded by the hydrophobic surfaces, such that spills on the surface collect in the non-hydrophobic spill containment area or areas and are prevented from spreading by the hydrophobic surfaces.

These and other objects, advantages and features of the invention will be more fully understood and appreciated by reference to the Description of the Preferred Embodiments, and the appended drawings.

BRIEF DESCRIPTION OF THE DRAWINGS

Preferred embodiments of the invention will now be described with reference to the drawings, in which.

DETAILED DESCRIPTION

In the preferred embodiments, the term "shelving and/or the like," "shelving," "shelf," or "shelf and/or the like" encompasses shelves and articles whose top surfaces such as pantry shelves, countertops, stovetops, cook-tops, and table tops. Certain embodiments are especially advantageous for use in refrigerator and freezer shelving.

Figure 5:
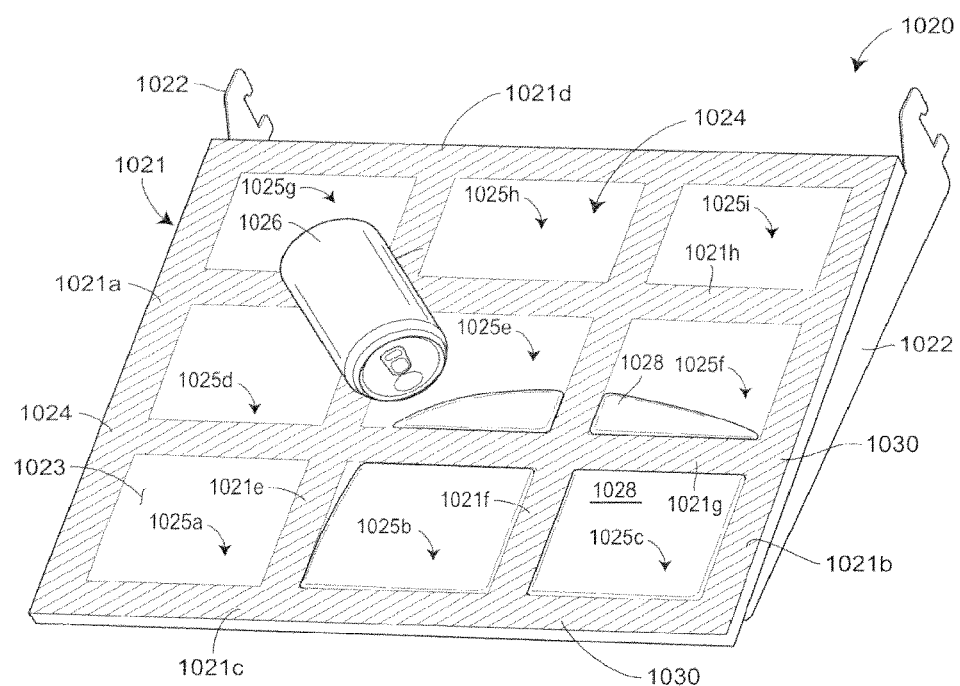
FIG. 5 is a perspective view of an alternative embodiment of a shelf assembly constructed in accordance with the present disclosure and having a grid-like hydrophobic spill containment pattern.
Figure 6:
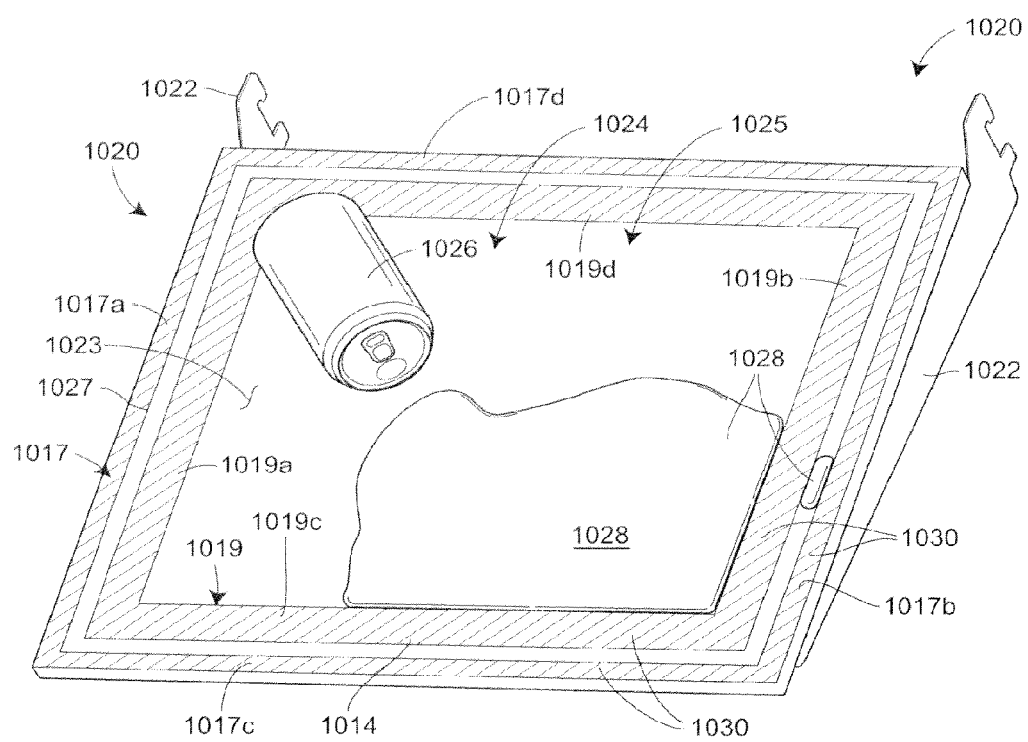
FIG. 6 is a perspective view of yet another alternative embodiment shelf assembly constructed in accordance with the present disclosure and having a hydrophobic spill containment pattern that includes first and second borders.

In such preferred embodiments of the invention, refrigerator shelving is provided with a spill containment pattern which may consist of a hydrophobic surface in the pattern of a frame-like border, which defines the boundaries of a single non-hydrophobic spill containment area therein. The pattern may be a frame-like border which extends along the perimeter of the shelf's top surface (FIG. 3), or it may be spaced from the perimeter and encompass a smaller portion of the top surface, and may include an outer border with a final spill catch area between the inner and outer border (FIG. 6). It may consist of a hydrophobic surface in a grid-like pattern, which pattern defines the boundaries of several spill containment areas therein (FIG. 5). Other variations are intended to be within the scope of the present disclosure.

A preferred embodiment shelf may be incorporated into a shelving assembly with a shelf-supporting mechanism, such as a bracket, and a shelf, which is capable of supporting articles on its top surface. The disclosure provided herein relates to the shelf portion of the assembly, and various brackets that can be used with the shelf.

The shelf may consist of a substrate formed of metal, glass, plastic, another suitable material, or a combination of any of the foregoing, and which has a hydrophobic surface which is generally in the same plane as the top surface of the shelf substrate and which is arranged in a spill containment pattern to provide a spill containment feature on the top surface of the shelf substrate, as illustrated in FIGS. 3-6 and described below. The majority of the surface area of the top surface of the shelf substrate is non-hydrophobic in nature. The non-hydrophobic region of the top surface is bounded by the hydrophobic spill containment pattern such that spilled liquids are repelled by the hydrophobic spill containment pattern and pool and remain contained on these non-hydrophobic spill containing areas by the hydrophobic surfaces. The shelves described herein can be adapted for use as refrigerator or freezer shelves, for example.

A hydrophobic or super hydrophobic surface treatment may be applied to the shelf substrate's top surface to create the hydrophobic spill containment pattern described herein in a variety of methods, and any surface coatings may be used which are known to be hydrophobic or super-hydrophobic or are known to make a surface hydrophobic or super-hydrophobic. The hydrophobic surface described herein is not limited to any specific hydrophobic or super hydrophobic surface treatment, and any method of making a portion of the surface of the shelf substrate hydrophobic may be employed.

More specifically, according to the preferred embodiments, there are several hydrophobic compounds which may be used. Some of the hydrophobic compounds include: fluorocarbons; fluoroalkyl silanes; fluoroalkoxy silanes; and fluoroalkyl alkyl silanes. Any such hydrophobic compounds or a mixture thereof can be used to create the hydrophobic surfaces described herein, and other applicable hydrophobic compounds could also be used. It is believed that tridecafluoro-1,1,2,2-tetrahydrooctyl trichlorosilane provides a good example of a suitable hydrophobic compound. Other suitable hydrophobic compounds include, for example, nonafluorohexyldimethyl(dimethylamino)silane, heptadecafluorotetrahydrodecyldimethyl(dimethylamino)silane, tetrandyrodecyl-tris(dimethylamino)silane, tridecafluoro-1,1,2,2,-tetrahydrooctyl silane, (tridecafluoro-1,1,2,2-tetrahydooctyl)trimethoxysilane, (tridecafluoro-1,1,2,2-tetrahydooctyl)triethoxysilane, n-octadecyl trimethoxysilane, n-octyl triethoxysilane, and heptadecafluoro-1,1,2,2-tetrahedyodecyl-tris(dimethylamino)silane. It is believed that the above-identified silanes bond and adhere strongly to glass and glass-like surfaces such as the cured ceramic frit material.

Further in accordance with the preferred embodiments described herein, methods of creating the hydrophobic surface may include, without limitation: application of a hydrophobic compound to the top surface using an application technique such as spraying; brushing; wiping; dipping; solvent casting; flow coating; curtain coating; roller coating; spin coating; printing; screen printing; ink jet printing;

vacuum coating; magnetic field-assisted cathodic sputtering; plasma deposition; plasma magnetron deposition; plasma or atmospheric CVD; powder or liquid pyrolysis; atomization or chemical vapor deposition; electrophoretic deposition; cross-linking processes; etc. Another method of creating the hydrophobic surface can include "roughening" the portion of the surface of the substrate to be made hydrophobic using various methods (sanding, abrading, etching, e.g., acid etching, or otherwise removing material from the surface) and then applying a hydrophobic compound to the "roughened" surface. Etching can be performed using, for example, hydrofluoric acid, sodium silicate, bifluorides, including for example, a ammonium bifluoride sodium bifluoride, and mixtures thereof, any other known etching solutions, and any mixtures thereof. Commercially available etching solutions are available, for example from Armour® Products (Hawthorne, N.J.). For examples, the Armour Etch Bath® Glass Dipping Solution (product name) or Armour Etch® Glass Etching Cream (product name), available from Armour® Products can be used, and includes a mixture of ammonium bifluoride and sodium bifluoride. The etching solution can be applied to the substrate surface with an applicator in the desired pattern. A mask, which is resistant to the etching solution, can be placed on the region of the substrate to be non-hydrophobic to protect this region from being etched. The etching solution can be allowed to remain on the substrate surface for a time in a range of about 15 seconds to about 20 minutes, about 20 seconds to about 15 minutes, about 30 seconds to about 10 minutes, about 45 seconds to about 8 minutes, about 1 minute to about 10 minutes, about 2 minutes to about 8 minutes, about 4 minutes to about 6 minutes, about 15 seconds to about 1 minute, about 20 seconds to about 50 seconds, about 25 seconds to about 45 seconds, about 30 seconds to about 40 seconds, about 1 minute to about 20 minutes, about 5 to about 15 minutes, or about 7 minutes to about 10 minutes. Other suitable times include, for example, about 15 seconds, 20 seconds, 25 seconds, 30 seconds, 35 seconds, 40 seconds, 45 seconds, 50 seconds, 55 seconds, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, and 20 minutes.

The hydrophobic surface can also be formed, for example, by providing a coating of hydrophobic particles on the surface, by using sol-gel deposition to apply a hydrophobic compound to the surface, either on top of or within the matrix of the sol-gel, by applying a metal oxide primer with an integrated or separate hydrophobic compound, by applying a hydrophobic compound comprising a variety of molecular chain lengths to create a coating with surface irregularities, or by adhering a thin material, such as a tape of thin glass or plastic which has been made hydrophobic to the surface. The hydrophobic surface can formed, for example, by applying a ceramic frit material, with or without structure forming particles therein, to the surface of the substrate in the desired spill containment pattern, curing the frit, and then applying a hydrophobic compound over the cured frit and curing the hydrophobic compound.

Any combination of the above-described surface treatment methods can be also be used. For example, the substrate can be first prepared by applying and curing a ceramic frit material to the substrate. The ceramic frit material can then be etched using an etching solution as described above, and a hydrophobic compound can be applied to the etched ceramic frit. Alternatively, the entire substrate including the ceramic frit material can be etched using an etching solution, and a hydrophobic compound can then be applied to the etched ceramic frit. Without intending to be bound by theory, it is believed that etching the ceramic frit prior to application of the hydrophobic compound can improve the hydrophobic properties of the spill containment pattern by creating additional bonding sites on the ceramic frit to which the hydrophobic compound can bond. Additionally, the etched ceramic frit may include more surface area to which the hydrophobic compound can attached by virtue of the combined macro-scale surface roughening provided by the ceramic frit and micro-scale surface roughening provided by etching the ceramic frit.

The hydrophobic surface treatments described herein can be cured according to a number of different methods, if curing is required by the surface preparation or the hydrophobic compound, including without limitation: conduction heating; convection heating; UV radiation; VUV radiation; electron beam irradiation; ionizing radiation; laser; IR; and thermal radiation. The hydrophobic surface treatments can also be cured by remaining at ambient conditions for a sufficient length of time, for example, from about 16 hours to about 48 hours, from about 20 hours to about 40 hours, and from about 25 hours to about 35 hours. Curing can be performed in a controlled humidity environment. For example, curing can be performed at less than 70% humidity, less than 60% humidity, less than 50% humidity, less than 40% humidity, less than 30% humidity, less than 20% humidity, less than 10% humidity, or at 0% humidity.

One preferred embodiment of the shelf assembly comprises a glass or tempered glass shelf substrate which is printed, e.g., screen printed, with a ceramic frit material, over which a hydrophobic coating is applied. The ceramic frit can be patterned on the substrate using any known placing, printing, or other patterning methods. The ceramic frit material is placed or printed in a pattern, for example, a frame-like border pattern on the glass substrate, which defines at least a portion of the spill containment pattern. For example, the ceramic frit material can be screen printed onto the substrate in the desired pattern using, for example, a silk screen having a mesh count in a range of about 80 to about 360, about 100 to about 300, about 120 to about 280, about 140 to about 240, about 160 to about 220, about 180 to about 200, about 86 to about 360. Other suitable mesh counts include about 80, 82, 84, 86, 88, 90, 92, 94, 96, 98, 100, 110, 120, 130, 140, 150, 160, 170, 180, 190, 200, 210, 220, 230, 240, 250, 260, 270, 280, 290, 300, 310, 320, 340, 350, and 360. Various other mesh counts may be suitable depending on the composition and particle size of the frit material used. As described in more detail below, the hydrophobic spill containment pattern, and consequently, the frit pattern, can have a variety of shapes and sizes, and can be placed in a variety of locations on the glass substrate. Additionally, portions of the hydrophobic spill containment pattern can be formed, for example, using different hydrophobic compounds and/or different surface treatments. For example, a portion of the spill containment pattern can be formed, for example, by applying and curing a ceramic frit to the substrate and applying a hydrophobic compound to the cured ceramic frit (as described in more detail below) and another portion of the hydrophobic spill containment pattern can be formed, for example, by acid etching a portion of the substrate and applying the hydrophobic compound to the etched portion.

In accordance with various aspects of the invention, the ceramic frit material can include finely ground particles. For example, the ceramic frit material can include lead oxide, silicon dioxide, aluminum oxide, and mixtures thereof.

Preferably, the frit material includes silicon dioxide. More preferably, the frit material includes from 5 weight percent (wt. %) to about 100 wt. % silicon dioxide, from about 10 wt. % to about 80 wt. %, from about 20 wt. % to about 60 wt. % from about 30 wt. % to about 40 wt. % from about 15 wt. % to about 75 wt. %, from about 20 wt. % to about 50 wt. %. Other suitable amounts of silicon dioxide in the frit material can include, for example, 5, 10, 15, 20, 25, 30, 35, 40, 45, 50, 55, 60, 65, 70, 75, 80, 85, 90, 95 and 100 wt. %. For example, the frit material can include about 29 wt. % silicon dioxide. The frit material can also include, for example, additives, such as tantalum oxide, titanium dioxide, calcium oxide, zirconium oxide, sodium oxide, potassium oxides, iron oxide magnesium oxide, barium oxide, bismuth oxide, and mixtures thereof. Suitable commercially available frit materials can be used. For example, a commercially available frit material is available from Ferro Corp. (hereinafter "the Ferro frit") under Product No. A0430 Etch C32 Medium, and contains about 53.71 wt. % lead oxide, about 29 wt. % silicon dioxide, 15.72 wt. % aluminum oxide, 0.39 wt. % tantalum oxide, 0.38 wt. % titanium dioxide, 0.28 wt. % calcium oxide, 0.26 wt. % zirconium oxide, 0.11 wt. % sodium oxide, 0.04 wt. % potassium oxide, 0.04 wt. % iron oxide, 0.03 wt. % magnesium oxide, 0.02 wt. % barium oxide, and 0.02 wt. % bismuth oxide. The particles of the frit material may be mixed with inorganic or organic pigments or dyes, so as to yield a desired color. The ceramic frit material may be provided as a dry powder or as a paste or other such mixture. Once the ceramic frit material is placed on the substrate, the ceramic frit is then coupled to the substrate. For example, the ceramic frit can be coupled to the substrate by fusing the ceramic frit to the substrate. The ceramic frit can be coupled or fused to substrate by heating the substrate to a temperature in a range of about 1000° F. to about 1400° F., about 1100° F. to about 1300° F., about 1100° F. to about 1200° F., and about 1200° F. to about 1400° F. Other suitable temperatures include about 1000° F., 1050° F., 1100° F., 1150° F., 1200° F., 1250° F., 1300° F., 1350° F., and 1400° F. This heat treatment will cause the particles of the ceramic frit to cure by fusing to each other and to the glass surface to form a continuous structure and thereby couple the ceramic frit to the substrate. The pattern of the fused frit will be substantially identical to the pattern in which the frit material was placed on the substrate. It is believed that this fused frit coating can be characterized as being nearly as hard and tough as the glass itself. Also, the coated glass with the ceramic frit material is durable, and resists chipping, peeling, fading, and scratching. Advantageously, the ceramic frit material is resistant to abrasions from common household containers, such as, for example, glass jars. In addition, the ceramic frit material is substantially resistant to most chemicals. Accordingly, the ceramic frit material is substantially resistant to a variety of cleaners that may be used to clean a glass shelf, including, for example, dish soap, such as Dawn dish soap, Windex, Sparkle, Clorox wipes, and Formula 409 All Purpose Cleaner. A shelf having a hydrophobic spill containment pattern formed from a ceramic frit can resist multiple cleanings without experiencing a decrease in the shelf's ability to retain spilled liquids.

In one embodiment, the ceramic frit can include some micro-scale additive particles which will remain unmelted at the temperature at which the frit is sintered, as described for example in U.S. Pat. No. 4,591,530 to Lui, U.S. Pat. Nos. 6,872,441 and 6,800,354 to Baumann, and U.S. Pat. Nos. 5,324,566 and 5,437,894 to Ogawa. The frit is printed or placed in the pattern of a frame-like border at or near the outer perimeter of the shelf substrate's top surface or other desired location for the spill containment pattern. The shelf with the printed frit is then heated to a temperature above the melting point of the primary components of the frit material, but below the melting point of the glass shelf, for a time sufficient to cure the frit so that it is fused or bonded to the top surface of the shelf substrate. The specific time and temperature required to sinter the frit will vary based on the materials chosen for the frit.

By way of example only, the application of the hydrophobic compound will be described with reference to a glass substrate having a fused frit surface modification. Other surface modifications and/or preparations, including for example, acid etching and other surface roughening methods, can be used as described above, and the hydrophobic compound can be similarly applied to such surface modified substrates. The hydrophobic compound, such as, for example, a fluorocarbon, a fluoroalkyl silane, a fluoroalkoxy silane, or a fluoroalkyl alkyl silane is then applied to the fused frit material. Suitable hydrophobic compounds can include, for example, tridecafluoro-1,1,2,2-tetrahydrooctyl trichlorosilane, nonafluorohexyldimethyl(dimethylamino) silane, heptadecafluorotetrahydrodecyldimethyl(dimethylamino)silane, tetrandyrodecyl-tris(dimethylamino)silane, tridecafluoro-1,1,2,2,-tetrahydrooctyl silane, (tridecafluoro-1,1,2,2-tetrahydooctyl)trimethoxysilane, (tridecafluoro-1,1,2,2-tetrahydooctyl)triethoxysilane, n-octadecyl trimethoxysilane, n-octyl triethoxysilane, and heptadecafluoro-1,1,2,2-tetrahedyodecyl-tris(dimethylamino)silane.

The hydrophobic compound can be applied to the frit material as a hydrophobic solution, which includes a solvent and the hydrophobic compound dissolved or dispersed in the solvent. The solvent can be, for example, dry or wet hexane. Suitable solvents include, for example, hexane, heptanes, methyl chloride, naptha, toluene, acetone, perfluorocarbons, and mixtures thereof. The hydrophobic solution can include from about 0.1% to about 5% of hydrophobic compound. Other suitable ranges include, for example, about 0.5% to 4%, about 1% to about 3%, about 1% to about 5%, and about 2% to about 4%. Suitable amounts of the hydrophobic compound in the hydrophobic solution, can include, for example, about 0.1, 0.2, 0.3, 0.4, 0.5, 0.6, 0.7, 0.8, 0.9, 1, 1.5, 2, 2.5, 3, 3.5, 4, 4.5, and 5%. For example, a 1% solution of tridecafluoro-1,1,2,2-tetrahydrooctyl trichlorosilane, a perfluoroalkyl alkyl silane, in hexane, can be applied to the fused frit, for example by wiping the solution onto the frit or applying the solution using an applicator tip, or by using any other known method. The hydrophobic compound can be applied to the solution using, for example, a one pass method in which a coated applicator is swept across the frit border a single time or a multiple pass method in which the applicator is passed over the frit border two or more times. The hydrophobic solution is then cured by heating it and/or exposing it to controlled humidity for a period of time. For example, conductive heating, convention heating, thermal radiation, UV radiation, VUV radiation, electron beam irradiation, ionizing radiation, laser, IR can be used to cure the hydrophobic solution. The hydrophobic solution can be cured, for example, at a temperature in a range of about 100° F. to about 600° F., about 150° F. to about 550° F., about 200° F. to about 500° F., about 250° F. to about 450° F., about 300° F. to about 350° F., or about 100° F. to about 300° F. Other suitable temperatures include, for example, about 100° F., 150° F., 200° F., 250° F., 300° F., 350° F., 400° F., 450° F., 500° F., 550° F., and 600° F. The hydrophobic solution can be cured, for example, by heating for a time in a range of about 5 minutes to about 1 hour, about 10 minutes to about 45 minutes, about 20 minutes to about 30 minutes, about 10 minutes to about 20 minutes, and about 15 minutes to about 30 minutes. Other suitable times include, for example, about 5, 10, 15, 20, 25, 30, 35, 40, 45, 50, 55, and 60 minutes. Alternatively, the hydrophobic solution can be cured without heating. Heating, however, can accelerate the curing process. For example, the hydrophobic solution can be allowed to cure by leaving the glass substrate having the cured ceramic frit coated with the hydrophobic solution in ambient conditions for a time in a range of about 16 to about 48 hours, about 20 to about 40 hours, about 25 to about 35 hours, about 16 to about 24 hours, or about 20 hours to about 30 hours. The hydrophobic solution can be cured, whether at elevated temperatures or at ambient temperature, in relatively dry environment. For example, the hydrophobic solution can be cured in an environment having less than 70% humidity, less than 60% humidity, less than 50% humidity, less than 40% humidity, less than 30% humidity, less than 20% humidity, less than 10% humidity, or at 0% humidity. Upon curing, the hydrophobic compound preferably forms a continuous hydrophobic layer on the fused frit or other surface treatment.

Without intending to be bound by theory, it is believed that in the case of a fluorosilane, bonding is achieved between surface Si—OH contained on and extending from the surface of the fused frit material or other modified substrate surface, such as, for example, an acid etched surface, and the Si—OH groups of the silane. The surface hydroxyl groups can results from partial hydrolysis of the silane and the silicon dioxide in the fused frit material during heating. The Si—OH groups are caused to react with corresponding groups to form Si—O—Si linkages between the silane and the fused frit material. Correspondingly, Si—OH groups of adjacent silane molecules are also caused to react and form Si—O—Si cross linkages, thereby forming a continuous hydrophobic layer across the frit material. The method described herein will produce a hydrophobic surface that is a continuous border around the perimeter of the shelf's top surface which will operate as a spill containment feature.

One advantage of using a ceramic frit material to prepare the surface of the shelf for coating with the hydrophobic solution as described herein, in addition to improving the durability of the hydrophobic surface, is that frit material is commercially available in multiple colors and can be printed in a manner which allows for the inclusion of designs, company names or logos in the surface area where the frit material is applied to the shelf substrate.

In accordance with the preferred embodiments, the hydrophobic surface provides a spill containment surface which prevents spilled liquids from leaking off of the shelf substrate's top surface. For example, a frit material can be placed or printed in a continuous border pattern around the perimeter of the glass substrate and fused to the glass substrate as described above. A hydrophobic compound can then be bonded to the fused frit material, and thereby form a hydrophobic spill containment pattern, which bounds a non-hydrophobic spill containment surface formed of the glass substrate. The hydrophobic spill containment pattern repels liquids, causing them to collect in the non-hydrophobic region or regions of the shelf. The hydrophobicity of the hydrophobic surface is sufficient to repel a spilled liquid and prevent it from crossing onto or over the hydrophobic surface and therefore forces the spilled liquid to bead up or puddle up on the non-hydrophobic regions of the shelf due to the surface tension of the liquid. Thus, the hydrophobic surface is capable of containing spills without the use of a barrier lip or barrier edging used in prior art spill containment assemblies which act as a "dam" for the spilled liquid. The hydrophobic spill containment pattern can retain a spill having a height when pooled in the non-hydrophobic region of less than about 5.5 mm. For example, the spill containment pattern can retain a spill having a height of about 0.5 mm, about 1 mm, about 1.5 mm, about 2 mm, about 2.5 mm, about 3 mm, about 3.5 mm, about 4 mm, about 4.5 mm, about 5 mm, or about 5.5 mm. The height of the spill liquid provides a measure of the amount of spilled liquid retained by a shelf regardless of the area of the non-hydrophobic spill containing region of the shelf. The height of the retained spill liquid is determined by dividing the volume of spill liquid retained by the shelf before failure (i.e. leakage) by the area of the non-hydrophobic spill containing region.

The reference to the fact that the hydrophobic surface is generally in the plane of the top surface of the shelf is intended to include surfaces and surface treatments, all or a portion of which may extend a small distance above the level of the top surface of the shelf which is not readily noticeable to the naked eye. For example, as described in greater detail above, the hydrophobic surface may be a hydrophobic coating, or a combination of a layer of ceramic frit and a hydrophobic coating on the ceramic frit. Such layers typically have a thickness of from about 0.001 microns to about 250 microns. Other suitable thickness ranges include from about 0.001 microns to about 2 microns, about 0.01 microns to about 1.5 microns, about 0.1 microns to about 1 microns, about 0.001 microns to about 10 microns, about 0.01 microns to about 8 microns, about 0.05 microns to about 7 microns, about 0.1 microns to about 5 microns, about 1 micron to about 4 microns, about 1 micron to about 10 microns, about 2 microns to about 8 microns, about 4 microns to about 6 microns, about 10 microns to about 100 microns, about 20 microns to about 80 microns, about 40 microns to about 60 microns, about 100 microns to about 250 microns, about 150 to about 200 microns, about 1 micron to about 250 microns, about 10 microns to about 200 microns, about 20 microns to about 150 microns, about 30 microns to about 100 microns, about 40 microns to about 80 microns, and about 50 microns to about 70 microns. Other suitable thickness include, for example, about 0.001, 0.005, 0.01, 0.05, 0.1, 0.5, 1, 5, 10, 15, 20, 30, 40, 50, 60, 70, 80, 90, 100, 110, 120, 130, 140, 150, 160, 170, 180, 190, 200, 210, 220, 230, 240, and 250 microns.

Figure 1:
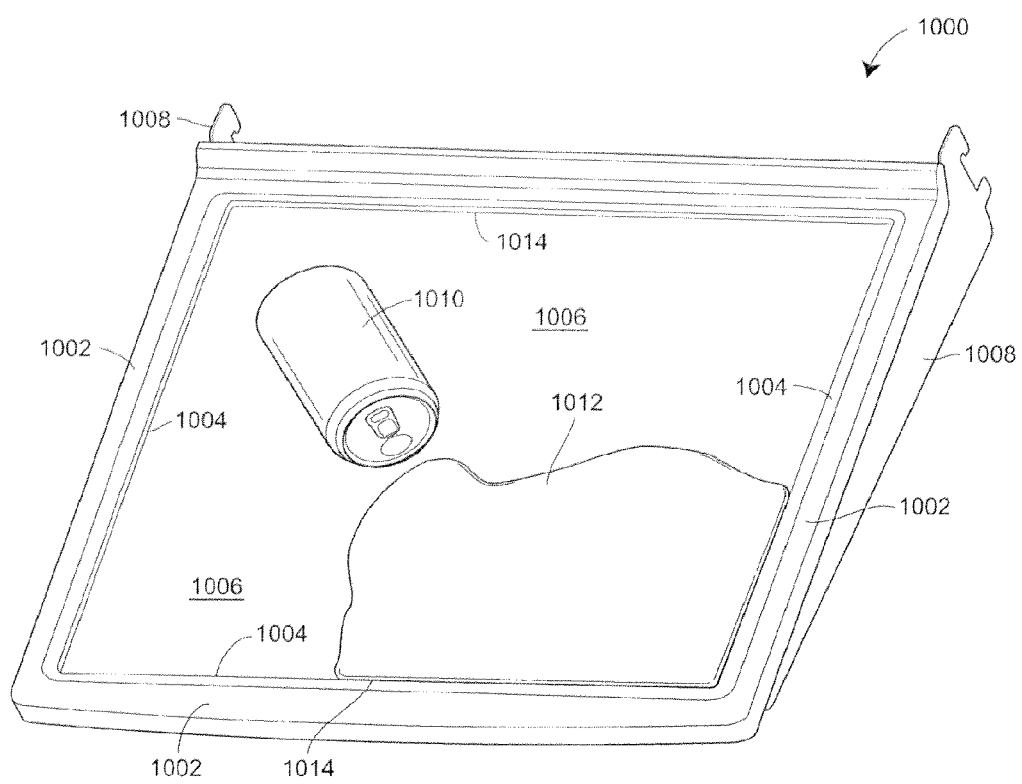
FIG. 1 is a perspective view of a prior art shelf assembly mounted on a pair of support brackets, and utilizing the concept of encapsulation of a shelf for providing spill containment features.
Figure 2:
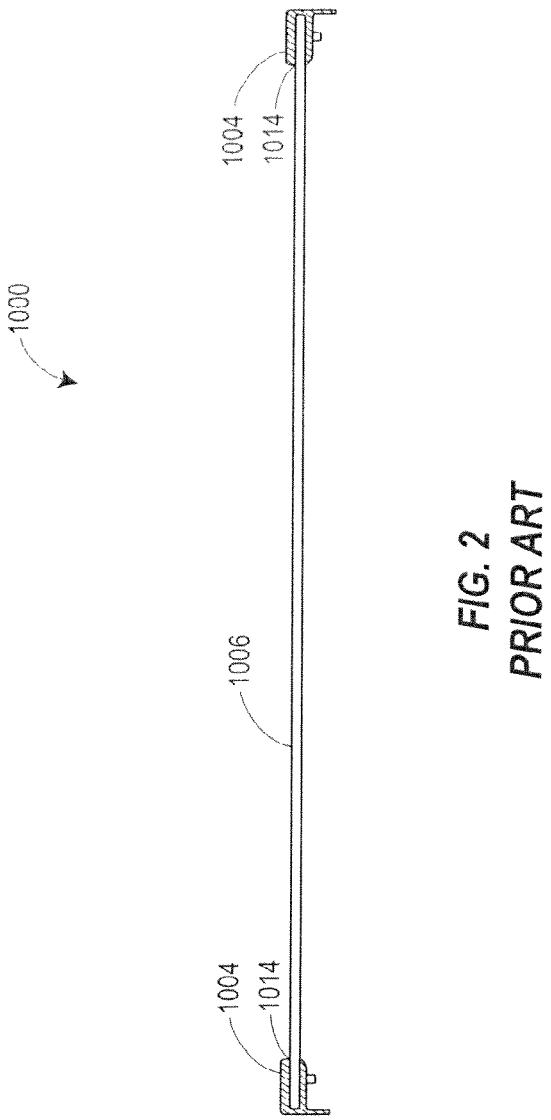
FIG. 2 is a front, sectional view of the shelf assembly shown in FIG. 1, with the absence of the support brackets.

A visual perspective of situations involving liquid spillage is illustrated in FIGS. 1 and 2 which illustrate a prior art shelving assembly 1000. With reference to FIG. 1, the assembly 1000 is shown in fairly simplistic format. The assembly 1000 may include a number of other components, including elements such as shelf support brackets, for example. Specifically, the assembly 1000 includes a frame 1002 which is rectangular in configuration and surrounds and is secured to an inner plastic rim 1004. The plastic rim 1004 is also a rectangular configuration. The plastic rim 1004 is utilized to encapsulate a shelf panel 1006. The shelf panel 1006 could be constructed of glass or similar materials. The frame 1002, plastic rim 1004 and shelf panel 1006 are supported on a pair of opposing side plates 1008.

To illustrate the concepts of liquid spillage, a soda can 1010 is illustrated as being left on its side on the upper surface of the shelf panel 1006. The soda can 1010 has spilled liquid which is shown as liquid 1012 on a portion of the shelf panel 1006. The visible edge of the shelf panel 1006 located on its upper surface at the intersection of the perimeter of the plastic rim 1004 may include a sealed edge 1014. As previously described herein, the sealed edge 1014 may merely include some type of a sealing adhesive or, alternatively, a silicone material or the like. In this manner, an attempt is made to essentially provide a raised physical barrier that is sealed to the shelf panel 1006 to seal the spilled liquid 1012 from spillage off of the shelf panel 1006.

Figure 3:
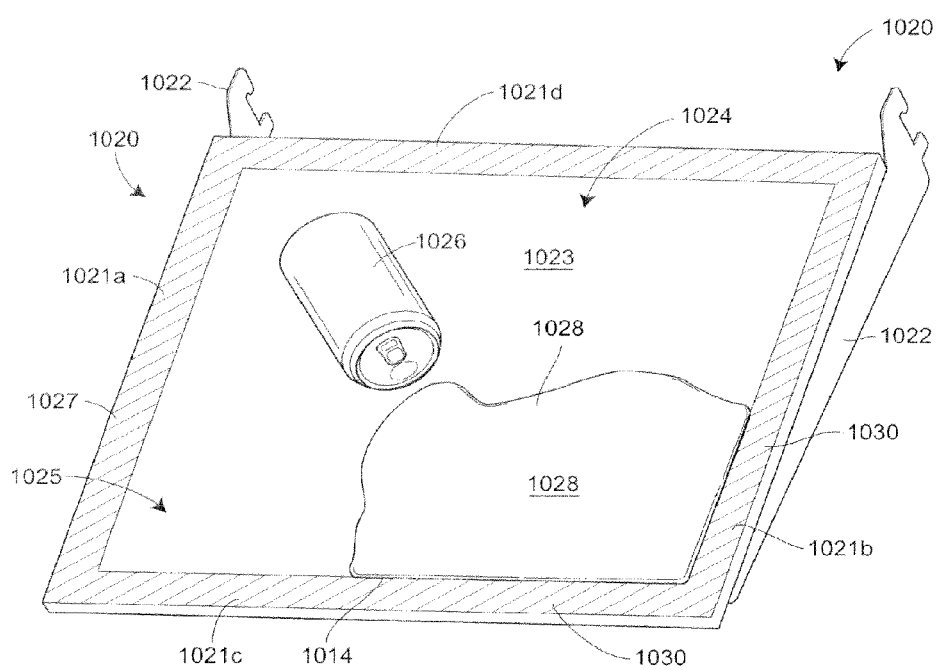
FIG. 3 is a perspective view of a shelf assembly in accordance with a preferred embodiment of the invention including a shelf mounted on a pair of support brackets, the shelf including a hydrophobic spill containment pattern disposed on the top surface thereof to contain spilled liquids.
Figure 4:
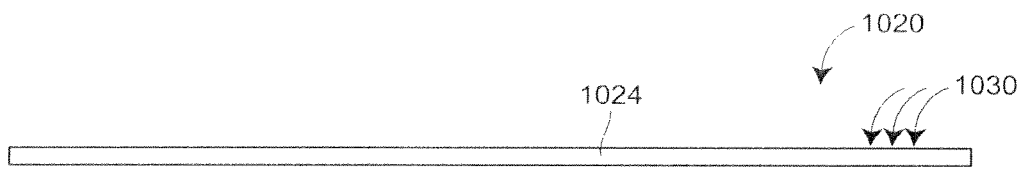
FIG. 4 is a front, elevation view of the shelf assembly shown in FIG. 3, with the absence of the support brackets.

A preferred embodiment shelf assembly 1020 of the present disclosure is illustrated in FIGS. 3 and 4. In accordance with the preferred embodiments described herein, the shelf assembly 1020 is characterized as having a shelf panel 1024 with a hydrophobic surface 1030 (shown shaded) arranged and configured in a spill containment pattern 1021 on a top surface 1023 of the shelf panel 1024 to provide the spill containment functions. In FIGS. 3 and 4, the spill containment pattern 1021 of the hydrophobic surface 1030 consists of a frame-like border disposed at or around the outer perimeter of the top surface 1023 of the shelf panel 1024, thereby completely bounding, encircling, and/or enclosing a non-hydrophobic central portion 1025 of the shelf panel 1024. More specifically, the spill containment pattern 1021 of the embodiment depicted in FIGS. 3 and 4 includes a continuous pattern formed of parallel left and right side edge containment strips 1021a, 1021b, and parallel front and rear edge containment strips 1021c, 1021d, i.e., all respectively engaged to adjacent ones. Each of the edge containment strips 1021a-1021d are generally uniform in width and arranged in an elongated linear configuration at a location directly at a respective edge of the shelf panel 1024. That is, in the embodiment depicted in FIGS. 3 and 4, there is no non-hydrophobic area on the top surface 1023 of the shelf panel 1024 between the spill containment pattern 1021 and the perimeter edge of the shelf panel 1024. In alternative embodiments, however, at least one of the strips 1021-1021d of the spill containment pattern 1021 depicted in FIGS. 3 and 4 can be offset inward from the perimeter edge of the shelf panel 1024 such that the shelf panel 1024 can include a non-hydrophobic area disposed between at least a portion of the spill containment pattern 1021 and the perimeter edge of the shelf panel 1024.

Still referring to FIGS. 3 and 4, the side edge containment strips 1021a, 1021b are disposed at substantially right angles relative to the front and rear edge containment strips 1021c, 1021d. So configured, the spill containment pattern 1021 of the embodiment depicted in FIGS. 3 and 4 forms a continuous, generally square, rectangular, and/or box-shape completely bounding, encircling, and/or enclosing the non-hydrophobic central portion 1025, which also has a generally square, rectangular, and/or box-shape.

As with other known refrigerator shelf assemblies, the shelf assembly 1020 of the present disclosure may also include shelf brackets 1022 for supporting the shelf assembly 1020 in a refrigerator or other appliance, for example. In a preferred embodiment, the shelf brackets 1022 are designed and configured such as to not interfere with and/or intrude upon the top surface 1032 of the shelf panel 1024, thereby maximizing the useable shelf space. Various embodiments of such shelf brackets 1022 will be described below with reference to FIGS. 7-18.

FIG. 3 also illustrates the concept that the hydrophobic surface 1030 will form a spill containment barrier. For example, a soda can 1026 is illustrated as being turned on its side on the top surface 1023 of the shelf panel 1024, and spilled liquid from the soda can 1026 is identified as liquid 1028. In this manner, the spilled liquid 1028 is prevented from spilling downwardly onto other surfaces below the shelf, and the spilled liquid 1028 is contained to the non-hydrophobic central portion 1025 defined on the top surface 1023 of the shelf 1024. Further, the spilled liquid 1028 is also prevented from seeping into cracks or crevices in a manner where substantial bacteria, mold, and other undesirable materials can form. In particular, and in accordance with the preferred embodiments, it should be noted that components such as a plastic rim (or even a frame) may be completely unnecessary with the use of the hydrophobic surface 1030 to provide the spill containment feature. As such, the shelf assembly 1020 depicted in FIGS. 3 and 4 maximizes the available useful shelf space since it does not include a plastic rim, a frame, or any other physical barrier or dam extending above the top surface 1023 of the shelf panel 1024 for preventing liquids from spilling off of the shelf panel 1024.

In addition to the embodiment shown in FIGS. 3 and 4, an alternative embodiment of the shelf assembly 1020 of the present disclosure can include the hydrophobic surface 1030 disposed on the top surface 1023 of the shelf panel 1024 in a grid-like spill containment pattern 1021, as shown in FIG. 5. Identical to the spill containment pattern 1021 described above with reference to FIGS. 3 and 4, the grid-like spill containment pattern 1021 depicted in FIG. 5 includes a continuous frame-like border disposed at or around the outer perimeter of the top surface 1023 of the shelf panel 1024. More specifically, the frame-like border of the spill containment pattern 1021 depicted in FIG. 5 includes parallel left and right side edge containment strips 1021a, 1021b, and parallel front and rear edge containment strips 1021c, 1021d. These spill containment strips 1021a-1021d can be generally identical to the corresponding spill containment strips 1021a-1021d described above with reference to FIGS. 3 and 4 and, therefore, will not be described in any further detail.

In addition to the aforementioned spill containment strips 1021a-1021d, the grid-like spill containment pattern 1021 depicted in FIG. 5 includes two spaced apart longitudinal spill containment strips 1021e, 1021f and two spaced apart lateral spill containment strips 1021g, 1021h. The longitudinal spill containment strips 1021c, 1021d intersect the lateral spill containment strips 1021e, 1021f at generally right angles. As depicted, the longitudinal spill containment strips 1021e, 1021f are parallel to each other, as well as parallel to the left and right side spill containment strips 1021a, 1021b. Moreover, the lateral spill containment strips 1021g, 1021h are parallel to each other, as well as parallel to the front and rear spill containment strips 1021c, 1021d. Other configurations are intended to be within the scope of the disclosure.

So configured, the grid-like spill containment pattern 1021 of the embodiment of the shelf assembly 1020 of FIG. 5 defines first through ninth non-hydrophobic central portions 1025a-1025i on the top surface 1023 of the shelf panel 1024. Each of the non-hydrophobic central portions 1025a-1025i is completely bounded, encircled, and/or enclosed by four of the spill containment strips 1021a-1021h and is therefore square, rectangular, and/or box-shaped. With this configuration, FIG. 6 illustrates that each of the non-hydrophobic central portions 1025a-1025i is capable of containing a liquid 1028 separate from the other non-hydrophobic central portions 1025a-1025i.

FIG. 6 shows yet another embodiment of a shelf assembly 1020 constructed in accordance with the present disclosure and including a spill containment pattern 1021. Similar to the shelf assemblies 1020 described above with reference to FIGS. 3-5, the shelf assembly 1020 of FIG. 6 includes a continuous frame-like border of a hydrophobic surface 1030 disposed at or around the outer perimeter of the top surface 1023 of the shelf panel 1024, thereby completely bounding, encircling, and/or enclosing a non-hydrophobic central portion 1025 of the shelf panel 1024. However, unlike the embodiments described above, the embodiment depicted in FIG. 6 includes a double-border configuration consisting of a first continuous hydrophobic surface border 1017 and a second continuous hydrophobic surface border 1019 disposed inside of the first hydrophobic surface border 1017.

The first hydrophobic surface border 1017 is disposed about the perimeter edge of the shelf panel 1024, and the second hydrophobic surface border 1019 is offset inwardly from the first hydrophobic surface border 1017. The first hydrophobic surface border 1017 includes parallel left and right side edge containment strips 1017*a*, 1017*b*, and parallel front and rear edge containment strips 1017*c*, 1017*d*. Each of the edge containment strips 1017*a*-1017*d* of the first continuous hydrophobic surface border 1017 are generally uniform in width and arranged in an elongated linear configuration directly at the edge of the perimeter of the shelf panel 1024. The side edge containment strips 1017*a*, 1017*b* are disposed at right angles relative to the front and rear edge containment strips 1017*c*, 1017*d*. So configured, the first hydrophobic surface border 1017 forms a continuous generally square, rectangular, and/or box-shape completely bounding, encircling, and/or enclosing the non-hydrophobic central portion 1025, which is also generally square, rectangular, and/or box-shaped. Moreover, as depicted, the second continuous hydrophobic surface border 1019 includes parallel left and right side edge containment strips 1019*a*, 1019*b*, and parallel front and rear edge containment strips 1019*c*, 1019*d*. Each of the edge containment strips 1019*a*-1019*d* of the second hydrophobic surface border 1019 are generally uniform in width and arranged in an elongated linear configuration offset inwardly from the first hydrophobic surface border 1017. The side edge containment strips 1019*a*, 1019*b* are disposed at right angles relative to the front and rear edge containment strips 1019*c*, 1019*d* such that the second hydrophobic surface border 1019 forms a generally square, rectangular, and/or box-shape completely bounding, encircling, and/or enclosing the non-hydrophobic central portion 1025 of the shelf panel 1024. So configured, the first and second hydrophobic surface borders 1017, 1019 define a non-hydrophobic ring portion 1027 located between the two borders 1017, 1019. The non-hydrophobic ring portion 1027 can advantageously capture any spill overflow which might escape from the non-hydrophobic central portion 1025 and travel over the second hydrophobic surface border 1019. These and other variations in the spill containment pattern 1021 can be made without departing from the spirit and scope of the novel concepts of the preferred embodiments of the present disclosure. For example, while FIG. 6 depicts a double-border pattern, a pattern of any number concentric or non-concentric border patterns could be provided on the substrate surface. Each border pattern can, for example, surround at least a portion of the non-hydrophobic region.

The hydrophobic surface arranged in a spill containment pattern in accordance with the preferred embodiments described herein eliminates the need for plastic encapsulation material to create a spill containment barrier. Accordingly, the shelves produced in accordance with the preferred embodiments described herein utilize relatively less material than prior art spill-containing shelves. Further, the shelves described herein have no need for silicone sealants to create a spill containment barrier. With the exception of the hydrophobic tape embodiment, they have no need for adhesives to create a spill containment barrier. Elimination of the need for these materials also results in relatively less use of material. Further, using the hydrophobic surfaces arranged in a spill containment pattern in accordance with the preferred embodiments eliminates the need for formed lips or ridges on the shelf's top surface, which reduces the amount of material used and the complexity of manufacturing, and, therefore, reduces the manufacturing cost.

Elimination of plastic encapsulation and sealants from the design of the shelf member also eliminates a potential source of failure or leakage since the sealants and plastic encapsulation may have cracks or crevices where they join with the shelf member in which organic or inorganic materials may become entrapped and involve a bond area to the shelf member which may eventually leak. Still further, the use of hydrophobic surfaces arranged in a spill containment pattern retains an amount of liquid comparable to that retained by prior art shelves having spill containing dam features, without the necessity of using the dams.

Still further, by eliminating the space taken up by plastic encapsulation, sealants, adhesives, or formed lips, ridges, physical barriers, and dams, the relative amount of usable shelf space is increased, i.e., maximized, on the top surface 1023 of the shelf panel 1024 in accordance with the preferred embodiments described herein.

A further aspect of the present disclosure that serves to maximize the usable shelf space includes shelf brackets 1022 that are specifically designed, arranged, and configured to adhere to a bottom surface and/or side edge of the shelf panel 1024, thereby avoiding any necessity to interfere with and/or obstruct at least the perimeter portions of the top surface 1023 of the shelf panel 1024 adjacent to the side edges and, in some embodiments, the entirety of the top surface 1023 of the shelf panel 1024.

Figure 7:
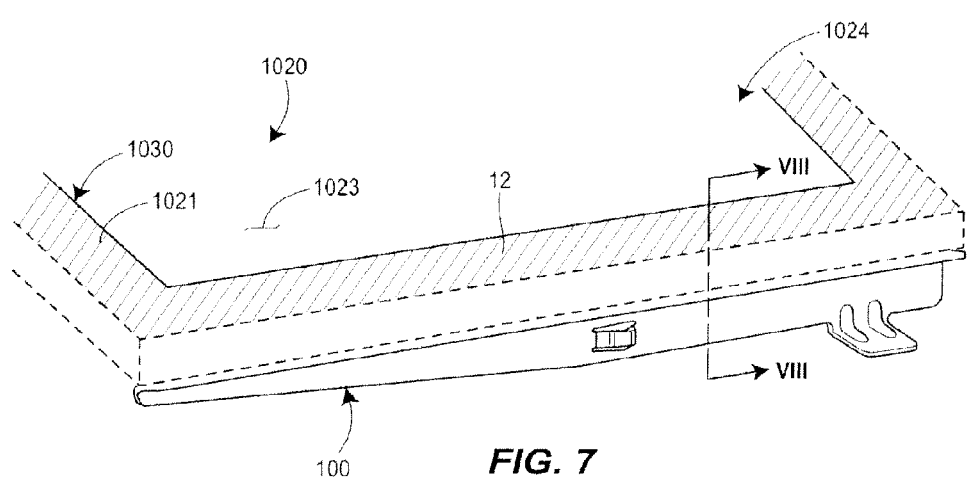
FIG. 7 is a partial perspective view of a shelf assembly including support brackets constructed in accordance with a first embodiment the present disclosure.
Figure 8:
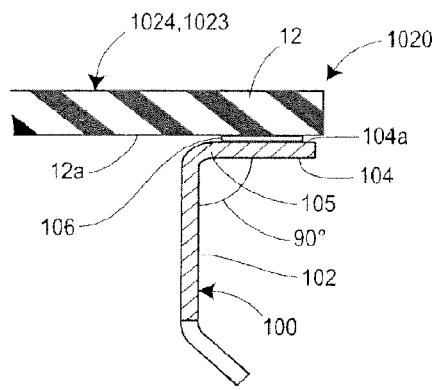
FIG. 8 is a cross-sectional view of the shelf assembly of FIG. 7 taken through line VIII-VIII of FIG. 7.

FIGS. 7 and 8 depict a shelf assembly 1020 including a pair of support brackets 100, only one of which is depicted, constructed in accordance with a first embodiment the present disclosure. Similar to the embodiments described above, the shelf assembly 1020 includes a flat shelf panel 1024 with a hydrophobic surface 1030 arranged and configured in a spill containment pattern 1021 on its top surface 1023. The spill containment pattern 1021 can resemble any of the patterns described above with respect to FIGS. 3-6, or otherwise.

The brackets 100 are mirror images of each other and are adhered to side perimeter portions 12 of the shelf panel 10. The brackets 100 of the embodiment depicted in FIGS. 7 and 8 are adapted to be slidably supported on ribs formed in the side panels of an appliance such as a refrigerator. As shown in FIG. 8 above, each bracket 100 includes a horizontal leg 104 and a vertical leg 102 extending downward from an inner edge 105 of the horizontal leg 104. As such, the brackets 100 have a generally upside-down L-shaped cross-section. The brackets 100 of this embodiment are preferably constructed of metal, but could be constructed of plastic or any other foreseeable material. The vertical and horizontal legs 102, 104 are disposed at an angle of approximately 90° relative to each other. So configured, the horizontal leg 104 includes a substantially horizontal top surface 104*a* that corresponds to and supports a generally horizontal bottom surface 12*a* of a corresponding side perimeter portion 12 of the shelf panel 10. Finally, a layer of an adhesive material 106 is disposed between the top surfaces 104*a* of the horizontal legs 104 of the brackets 100 and the bottom surface 12*a* of the side perimeter portions 12 of the shelf panel 10 to adhere the shelf panel 10 to the brackets 100. The adhesive material 106 can include a clear acrylic UV-cured adhesive, a clear polyurethane hot melt, or any other adhesive material capable of serving the principles of the present disclosure. So configured, and as illustrated in FIGS. 7 and 8, no aspect of the brackets 100 extends above and/or over the top surface 1023 of the shelf panel 1024. That is, in this embodiment, the brackets 100 are disposed entirely below the top surface 1023 of the shelf panel 1024, e.g., entirely opposite the shelf panel 1024 from its top surface 1023. As such, the usable space on the top surface 1023 is maximized.

Figure 9:
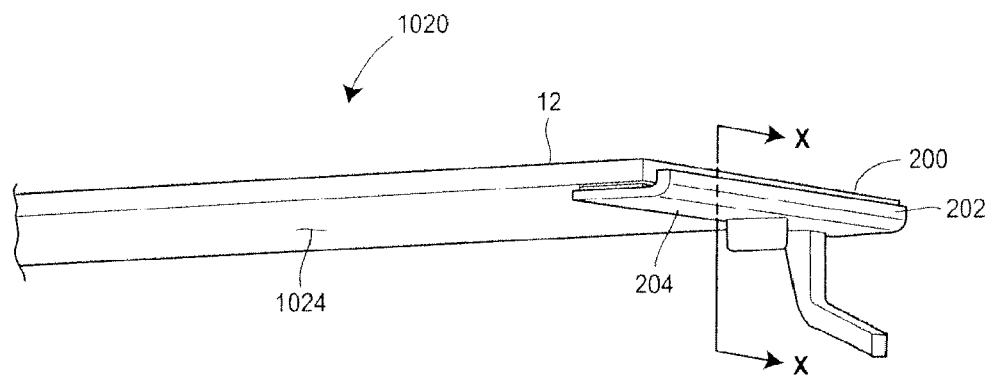
FIG. 9 is a partial perspective view of a shelf assembly including support brackets constructed in accordance with a second embodiment of the present disclosure.
Figure 10:
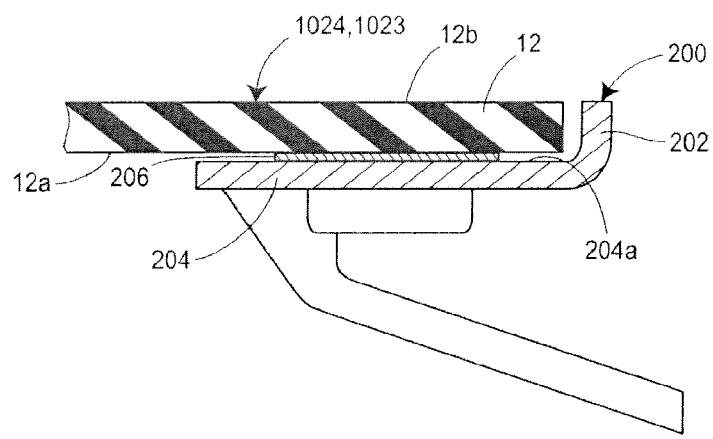
FIG. 10 is a cross-sectional view of the shelf assembly of FIG. 9 taken through line X-X of FIG. 9.

FIGS. 9 and 10 depict a shelf assembly 1020 including a pair of support brackets 200, only one of which is depicted, constructed in accordance with a second embodiment the present disclosure. Similar to the embodiments described above, the shelf assembly 1020 includes a flat shelf panel 1024 with a hydrophobic surface (not shown) arranged and configured in a spill containment pattern (not shown) on its top surface 1023. The spill containment pattern can resemble any of the patterns described above with respect to FIGS. 3-6, or otherwise.

The brackets 200 are mirror images of each other and are adhered to opposing side perimeter portions 12 of the shelf panel 1024. The brackets 200 are adapted to be slidably supported on ribs formed in the side panels of an appliance such as a refrigerator. As shown in FIG. 10, each bracket 200 includes a horizontal leg 204 and a vertical leg 202 extending upward from an outer edge 205 of the horizontal leg 204. As such, the brackets 200 have a generally L-shaped cross-section. The vertical leg 202 may or may not extend beyond the top surface 1023 of the shelf panel 1024. The brackets 200 of this embodiment can be constructed of plastic, metal, or any other suitable material. The vertical and horizontal legs 202, 204 are disposed at an angle of approximately 90° relative to each other. So configured, the horizontal leg 204 includes a substantially horizontal top surface 204a that corresponds to and supports a generally horizontal bottom surface 12a of a corresponding side perimeter portion 12 of the shelf panel 1024. Finally, a layer of an adhesive material 206 is disposed between the top surfaces 204a of the horizontal legs 204 of the brackets 200 and the bottom surface 12a of the corresponding side perimeter portions 12 of the shelf panel 1024 to adhere the shelf panel 1024 to the brackets 200. The adhesive material 206 can include a clear acrylic UV-cured adhesive, a clear polyurethane hot melt, or any other adhesive material capable of serving the principles of the present disclosure. So configured, and as illustrated in FIGS. 9 and 10, no aspect of the brackets 200 extends above and/or over the top surface 1023 of the shelf panel 1024. That is, in this embodiment, the brackets 200 are disposed entirely below the top surface 1023 of the shelf panel 1024. The horizontal legs 204 are disposed entirely opposite the shelf panel 1024 from its top surface 1023, and the vertical legs 202 are disposed entirely to the side of the shelf panel 1024. As such, the usable space on the top surface 1023 is maximized.

Figure 11:
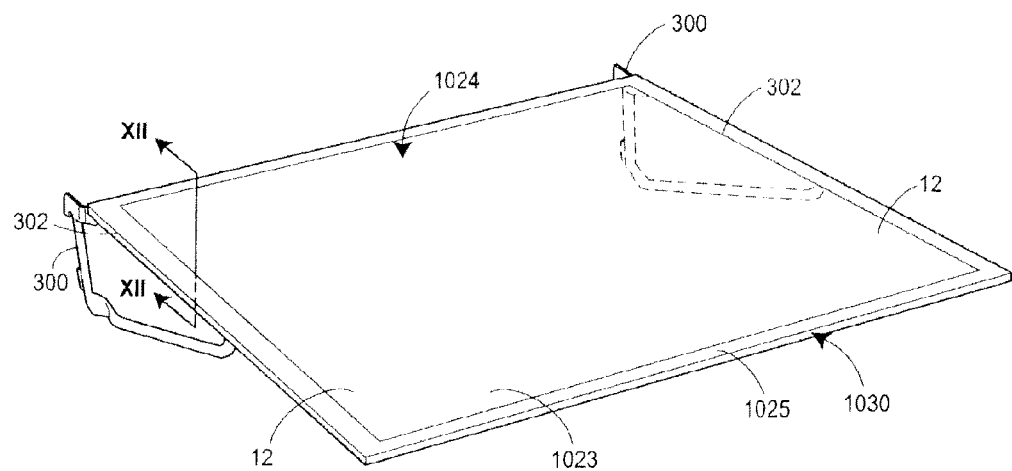
FIG. 11 is a perspective view of a shelf assembly including support brackets constructed in accordance with a third embodiment of the present disclosure.
Figure 12:
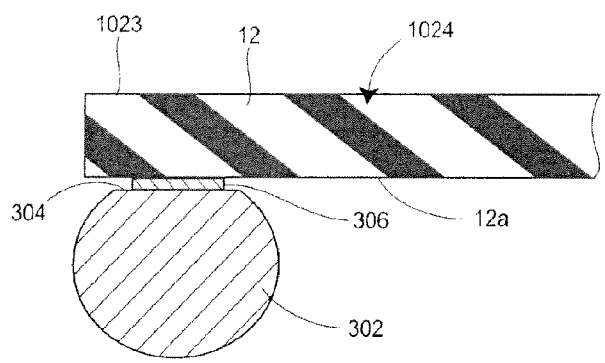
FIG. 12 is a cross-sectional view of the shelf assembly of FIG. 11 taken through line XI-XI of FIG. 11.

FIGS. 11 and 12 depict a shelf assembly 1020 including a pair of support brackets 300 constructed in accordance with a third embodiment the present disclosure. Similar to the embodiments described above, the shelf assembly 1020 includes a flat shelf panel 1024 with a hydrophobic surface 130 arranged and configured in a spill containment pattern 1021 on its top surface 1023. The spill containment pattern can resemble any of the patterns described above with respect to FIGS. 3-6, or otherwise.

The brackets 300 are adapted to latch into ladder racks, for example, at the rear of an appliance such as a refrigerator in a conventional manner. Each bracket 300 includes an elongated top member 302 with a generally circular cross-section. In one form, depicted in FIG. 12, the top member 302 includes a horizontal supporting surface 304 formed, for example, by forging, stamping, or crushing the round wire in a fixture. So configured, the supporting surface 304 corresponds to and supports a generally horizontal bottom surface 12a of a corresponding side perimeter portion 12 of the shelf panel 1024. In another form, the elongated top member 302 may not include the horizontal supporting surface 304, but rather, can have a perfectly circular cross-section providing a line of contact between the top member 302 and the shelf panel 1024. Finally, a layer of an adhesive material 306 is disposed between the top members 302 of the brackets 300 and the bottom surface 12a of the corresponding side perimeter portions 12 of the shelf panel 1024 to fix the shelf panel 10 to the brackets 300. The adhesive material 306 can include a clear acrylic UV-cured adhesive, a clear polyurethane hot melt, or any other adhesive material capable of serving the principles of the present disclosure. So configured, and as illustrated in FIGS. 11 and 12, no aspect of the brackets 300 extends above and/or over the top surface 1023 of the shelf panel 1024. That is, in this embodiment, the brackets 300 are disposed entirely below the top surface 1023 of the shelf panel 1024, e.g., entirely opposite the shelf panel 1024 from its top surface 1023. As such, the usable space on the top surface 1023 is maximized.

Figure 13:
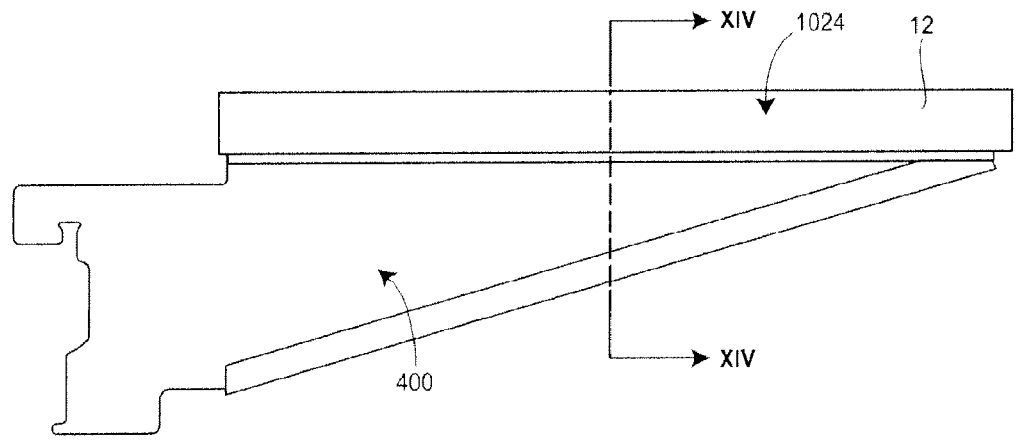
FIG. 13 is a side view of a shelf assembly including support brackets constructed in accordance with a fourth embodiment of the present disclosure.
Figure 14:
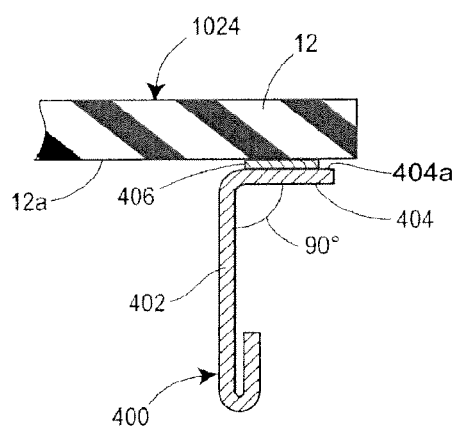
FIG. 14 is a cross-sectional view of the shelf assembly of FIG. 13 taken through line XIV-XIV of FIG. 13.

FIGS. 13 and 14 depict a shelf assembly 1020 including a pair of support brackets 400, only one of which is shown, constructed in accordance with a fourth embodiment the present disclosure. Similar to the embodiments described above, the shelf assembly 1020 includes a flat shelf panel 1024 with a hydrophobic surface (not shown) arranged and configured in a spill containment pattern (not shown) on its top surface 1023. The spill containment pattern can resemble any of the patterns described above with respect to FIGS. 3-6, or otherwise.

The brackets 400 are mirror images of each other. The brackets 400 are adapted to latch into ladder racks, for example, at the rear of an appliance such as a refrigerator in a conventional manner. As illustrated, each bracket 400 includes a tri-angular shaped plate a vertical plate portion 402 and a horizontal plate portion 404, thereby having a generally L-shaped upper cross-section. The brackets 400 of this embodiment can be constructed of metal, plastic, or any other suitable material. The vertical and horizontal plate portions 402, 404 are disposed at an angle of approximately 90° relative to each other. So configured, the horizontal plate portion 404 includes a substantially horizontal top surface 404a that corresponds to and supports a generally horizontal bottom surface 12a of a corresponding side perimeter portion 12 of the shelf panel 1024. Finally, a layer of an adhesive material 406 is disposed between the top surfaces 404a of the horizontal plate portions 404 of the brackets 400 and the bottom surface 12a of the side perimeter portions 12 of the shelf panel 1024 to fix the shelf panel 1024 to the brackets 400. The adhesive material 406 can include a clear acrylic UV-cured adhesive, a clear polyurethane hot melt, or any other adhesive material capable of serving the principles of the present disclosure. So configured, and as illustrated in FIGS. 13 and 14, no aspect of the brackets 400 extends above and/or over the top surface 1023 of the shelf panel 1024. That is, in this embodiment, the brackets 400 are disposed entirely below the shelf panel 1024, e.g., entirely opposite the shelf panel 1024 from its top surface 1023. As such, the usable space on the top surface 1023 is maximized.

Figure 15:
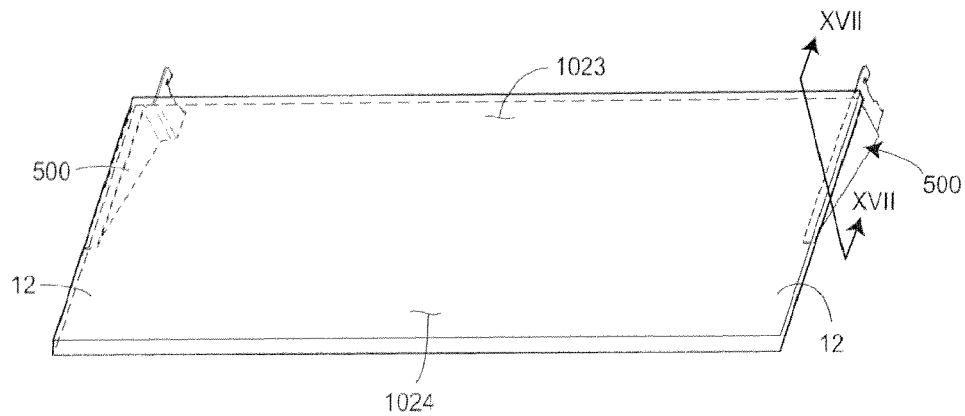
FIG. 15 is a perspective view of a shelf assembly including support brackets constructed in accordance with a fifth embodiment of the present disclosure.
Figure 16:
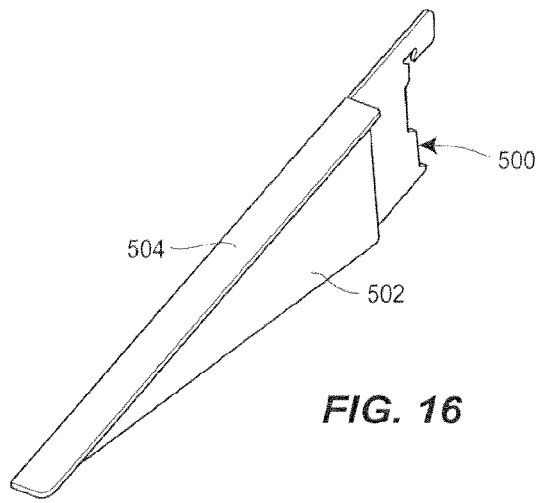
FIG. 16 is a perspective view of a support bracket of the shelf assembly of FIG. 15.
Figure 17:
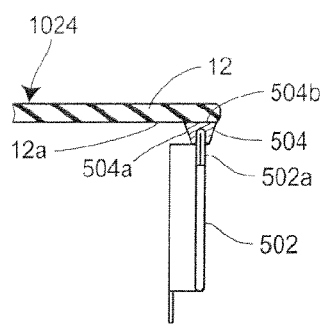
FIG. 17 is a cross-sectional view of the shelf assembly of FIG. 15 taken through line XVII-XVII of FIG. 15.

FIGS. 15-17 depict a shelf assembly 1020 including a pair of support brackets 500 constructed in accordance with a fifth embodiment the present disclosure. Similar to the embodiments described above, the shelf assembly 1020 includes a flat shelf panel 1024 with a hydrophobic surface (not shown) arranged and configured in a spill containment pattern (not shown) on its top surface 1023. The spill containment pattern can resemble any of the patterns described above with respect to FIGS. 3-6, or otherwise.

The brackets 500 are mirror images of each other. The brackets 500 are adapted to latch into ladder racks, for example, at the rear of an appliance such as a refrigerator in a conventional manner. As illustrated in FIGS. 16 and 17, each bracket 500 includes a metal tri-angular shaped plate portion 502 and a plastic supporting rail 504. The supporting rail 504 includes an elongated recess 504a receiving an elongated top edge 502a of the plate portion 502. The supporting rail 504 is immovably fixed to the plate portion 502 by snap-fit or adhesion, for example. Additionally, the supporting rail 504 includes a substantially horizontal top surface 504b that corresponds to and supports a corresponding generally horizontal bottom surface 12a of the shelf panel 1024. Finally, the bottom surfaces 12a of the side perimeter portions 12 of the shelf panel 1024 are adhered to the top surfaces 504b of the supporting rails 504 with an adhesive material (not shown) to fix the shelf panel 10 to the brackets 500. The adhesive material can include a clear acrylic UV-cured adhesive, a clear polyurethane hot melt, or any other adhesive material capable of serving the principles of the present disclosure. So configured, and as illustrated in FIGS. 15-17, no aspect of the brackets 500 extends above and/or over the top surface 1023 of the shelf panel 1024. That is, in this embodiment, the brackets 500 are disposed entirely below the top surface 1023 of the shelf panel 1024, e.g., entirely opposite the shelf panel 1024 from its top surface 1023. As such, the usable space on the top surface 1023 is maximized.

Figure 18:
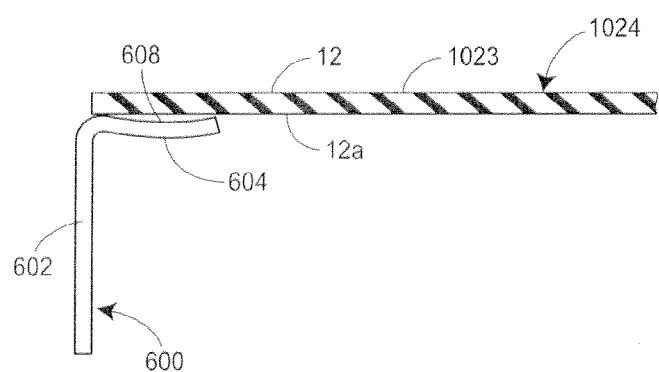
FIG. 18 is a schematic partial cross-sectional view of a shelf assembly including support brackets constructed in accordance with a sixth embodiment of the present disclosure.
Figure 19:
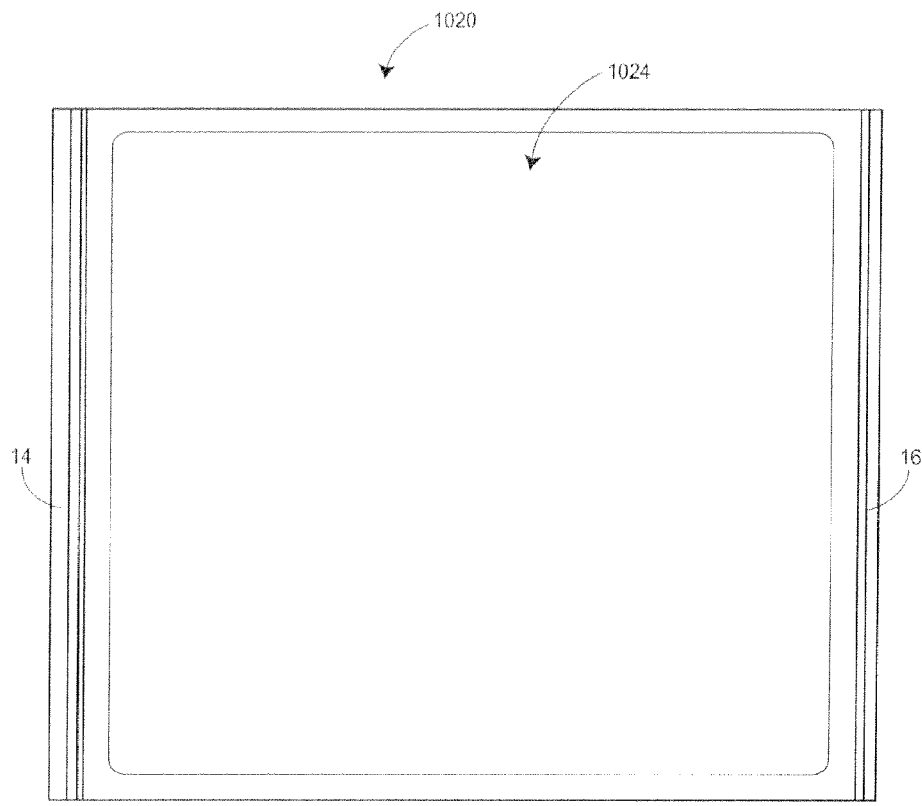
FIG. 19 is a top view of a shelf assembly including front and rear trim components in accordance with a seventh embodiment of the present disclosure.
Figure 20:
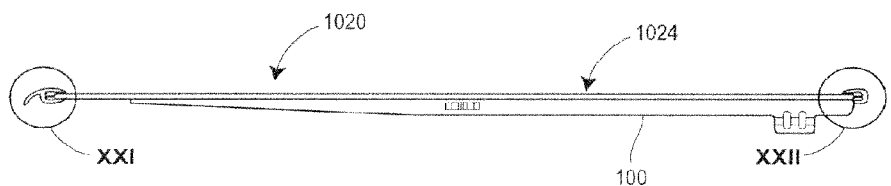
FIG. 20 is a side view of the shelf assembly of FIG. 19.

FIG. 18 depicts a portion of a shelf assembly 1020 including a pair of support brackets 600, only one of which is shown, constructed in accordance with a sixth embodiment the present disclosure. Similar to the embodiments described above, the shelf assembly 1020 includes a flat shelf panel 1024 with a hydrophobic surface (not shown) arranged and configured in a spill containment pattern (not shown) on its top surface 1023. The spill containment pattern can resemble any of the patterns described above with respect to FIGS. 3-6, or otherwise.

As shown, the support brackets 600 are adapted to support opposing side perimeter portions 12 of a flat shelf panel 1024 in a manner generally the same as those described above. Each bracket 600 includes a vertical plate portion 602 and a horizontal plate portion 604, thereby having a generally upside-down L-shaped cross-section. The vertical and horizontal plate portions 602, 604 are disposed at an angle of approximately 90° relative to each other. Additionally, however, the horizontal plate portion 604 includes a curved concave profile defining an elongated channel 608 in its topside and extending along the length thereof. Finally, a layer of an adhesive material (not shown) is disposed in the channel 608 between the bracket 600 and a bottom surface 12a of the side perimeter portions 12 of the shelf panel 1024. While the channel 608 of the embodiment depicted above is formed by the horizontal plate portion 604 being curved, the channel 608 could alternatively be formed simply by having a recess in the top surface of the horizontal plate portion 604. So configured, the bottom surface of the horizontal plate portion 604 does not necessarily have to be curved, as illustrated.

This channel concept for receiving adhesive could be applied to any of the support brackets described above with reference to FIGS. 7-17. For example, the horizontal legs 104, 204, 404 of the brackets 100, 200, 400 depicted in FIGS. 7 and 8, FIGS. 9 and 10, and FIGS. 13 and 14, respectively, could include channels disposed in the top surfaces 104a, 204a, 304a thereof for receiving adhesive. Similarly, the top members 302 of the brackets 300 depicted in FIGS. 11 and 12 could include channels disposed in top surfaces thereof for receiving adhesive. In the embodiment depicted in FIGS. 11 and 12, the channels could be formed directly into the horizontal supporting surfaces 304 of the top members 302 of the brackets 300. Finally, in the embodiment depicted in FIGS. 15-17 channels for receiving adhesive could be formed in the horizontal top surfaces 504b of the supporting rails 504 of the brackets 500. Therefore, it should be appreciated that the concept of providing channels in the top surfaces of the support brackets for receiving adhesive is not limited to the embodiment depicted in FIG. 18, but rather, can be applied to any of the embodiments expressly described herein, as well as any embodiment covered by the scope of the attached claims.

As mentioned above, any of the foregoing shelf brackets 100-600 can be constructed of any one or more of a variety of materials such as metal, plastic, etc. and they may be attached to the shelf panel 1024 using any one or more of a variety of different adhesives, or other attachment means. The process and/or method for assembling these components can also include a variety of variations.

For example, in one embodiment the brackets described with reference to FIGS. 7 and 8, for example, could be constructed of a sheet metal with an epoxy polyester hybrid powder disposed on them. The brackets are placed into a fixture and the adhesive, which can include Loctite 3494 acrylic UV/Visible light-cured adhesive, is applied to the top surface of the brackets automatically. The glass shelf panel is then placed into the fixture on top of the adhesive and a clamping pressure is applied to the top of the glass shelf panel. The adhesive "wets out," i.e., the adhesive spreads out to a thickness of about 0.006" to about 0.010" thick. The parts are then passed under a mercury UV lamp (wavelength of about 365 nm, at about 200-400 watts per inch) for about 12-18 seconds, with the adhesive being disposed about 5.5" to about 6" away from the lamp. Once the adhesive is cured, the clamping pressure is removed and the assembly can be removed from the fixture.

In an alternative to this method, a hot-melt polyurethane adhesive can be used to secure the shelf panel to the brackets. First, the brackets are placed into a fixture, and a melted polyurethane adhesive is applied instead of the UV cured adhesive described above. The part is again clamped as the adhesive quick-sets. No lights are needed. The assembly can then be removed from the fixture.

In yet another alternative method, an adhesive tape, such as 3M VHB tape, can be used instead of a liquid adhesive. This tape would be placed onto either the underside of the glass shelf panel or on the top surface of the support brackets. Protective paper would then be removed from the tape, and the glass shelf panel and the support brackets can be joined together in a fixture, similar to that described above. A small amount of pressure is applied to the glass shelf panel to set the tape, and then the assembly can be removed from the fixture.

While the foregoing embodiments of the shelf assembly 1020 have been described as including shelf panels 1024 with top surfaces 1023 that are completely free from intrusion or other obstruction, thereby maximizing the available shelf space, alternative embodiments of the shelf assembly 1020 can include rear and/or front trim components. Such rear and/or front trim components are minimally invasive, but can perform functions that may be desirable in certain applications.

For example, as mentioned above, the shelf assemblies 1020 described with reference to FIGS. 7 and 8, and FIGS. 9 and 10, include support brackets 100, 200, respectively, that are adapted to be slidably supported on ribs formed in the side panels of an appliance such as a refrigerator. Such slidable shelf assemblies 1020 can benefit from the incorporation of rear and front trim components.

For example, FIGS. 19-22 illustrate one embodiment of such a slidable shelf assembly 1020 including, for the sake of illustration only, the support brackets 100 described above with reference to FIGS. 7 and 8. The shelf assembly 1020 of FIGS. 19-22 could equally include the support brackets 200 described with reference to FIGS. 9 and 10. The shelf assembly 1020 includes a completely flat glass shelf panel 1024, a pair of opposing support brackets 100, a front trim component 14, and a rear trim component 16. The support brackets 100 are adhered to the bottom of the side edges of the shelf panel 1024 for slidably supporting the shelf panel 1024 within a refrigerator in a manner identical to that described with reference to FIGS. 7 and 8.

The front trim component 14 includes an elongated plastic member with a length substantially identical to the width of the shelf panel 1024. As shown in more detail in FIG. 21 the front trim component 14 includes a generally U-shaped attachment portion 18 and a lip portion 20 extending outward from the attachment portion 18. The attachment portion 18 defines an elongated channel 22 with a plurality of barbed ribs 24 formed on both the upper and lower legs 18a, 18b of the attachment portion 18 and extending into the channel 22. The channel 22 receives the front edge of the shelf panel 1024 such that the barbed ribs 24 frictionally engage the panel 1024 and fix the front trim component 14 thereto. So configured, the front trim component 14 and, more particularly, the lip portion 20 of the front trim component 18 serves as a "bumper," for example, to prevent bottles or other glass objects that are being loaded into the refrigerator from impacting the bare glass edge of the shelf panel 1024 and breaking the same.

Figure 22:
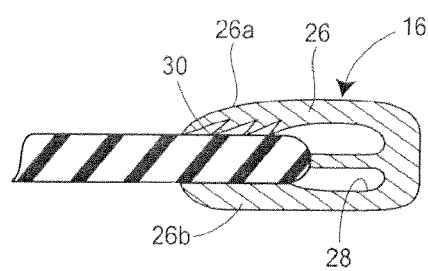
FIG. 22 is a detail view of the rear trim component of the shelf assembly of FIGS. 19 and 20 taken from circle XXII of FIG. 20.

Referring now to FIG. 22, the rear trim component 16 of the shelf assembly 1020 is illustrated as being substantially identical to the front trim component 14, but without the lip portion extending outward. Instead, the rear trim component 16 merely includes a generally U-shaped attachment portion 26 having upper and lower legs 26a, 26b. The attachment portion 26 defines an elongated channel 28 with a plurality of barbed ribs 30 formed only on the upper leg 26a of the attachment portion 26. The channel 28 receives the rear edge of the shelf panel 1024 such that the barbed ribs 30 frictionally engage the shelf panel 1024 and fix the rear trim component 16 thereto. So configured, the rear trim component 16 serves as a "stopper" to prevent items stored on the back portion of the shelf panel 1024 from sliding off of the shelf panel 1024 in the event that a user abruptly slides the shelf assembly 1020 out of the refrigerator.

Figure 21:
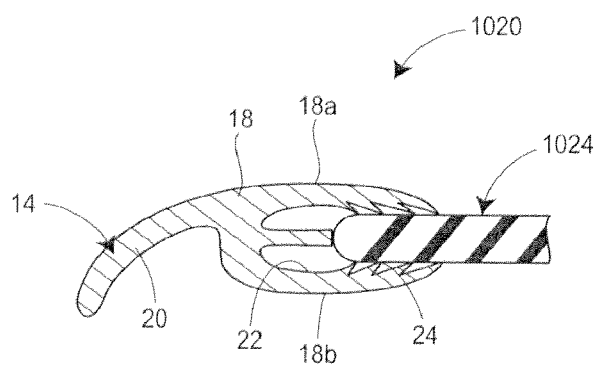
FIG. 21 is a detail view of the front trim component of the shelf assembly of FIGS. 19 and 20 taken from circle XXI of FIG. 20.
Figure 23:
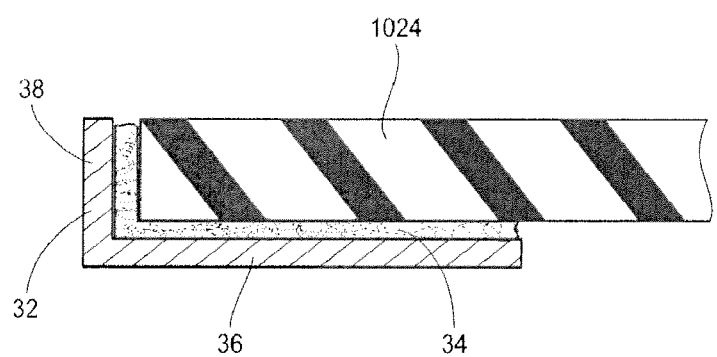
FIG. 23 is a detail view of front portion of a shelf assembly including a front trim component in accordance with an eighth embodiment of the present disclosure.

While FIG. 21 depicts a front trim component 14 that is U-shaped and receives the front edge of the shelf panel 1024, other configurations are intended to be within the scope of the present disclosure. For example, FIG. 23 illustrates an alternative front trim component 32. The trim component 32 extends generally the length of and is fixed to the front edge of the shelf panel 1024 with a layer of adhesive 34. The front trim component 32 includes a generally L-shaped cross-section and includes a horizontal leg 36 and a vertical leg 38 disposed at an angle of approximately 90° relative to the horizontal leg 36. The front trim component 32 is preferably constructed of a plastic material such that the vertical leg 38 thereof can absorb the impact of glass bottles being loaded into the refrigerator, for example, and prevent breakage. While the trim component 32 in FIG. 23 is described as being constructed of plastic, other materials are intended to be within the scope of the present disclosure. One advantage of the trim component 32 depicted in FIG. 23 is that it does not interfere with, encroach upon, or otherwise obstruct the top surface 1023 of the shelf panel 1024. As such, the available space on the top surface 1023 is maximized while also providing the "bumper" function.

The following examples are merely intended to illustrate the shelf assemblies of the present disclosure, and are not meant to limit the scope thereof in any way.

EXAMPLES

Examples 1-29: Water Retention Testing

The shelves having a hydrophobic spill containment pattern of various embodiments of the present disclosure were tested to determine what amount of water that could be retained on the shelf without failure (i.e. leakage). To accommodate for variations in the area of the shelves, which would affect the volume of liquid retained, the amount of retained water was measured as the height of the water retained in the non-hydrophobic region. Testing was completed by first leveling the shelf using a leveling apparatus. The shelf can be placed over a tray to catch any leakage from the shelf. The test water had a temperature in a range of 32° F. to 50° F. Water was poured slowly so as not to cause "waves" or splashes" onto the geometric center of the non-hydrophobic region. For example, water can be poured onto the shelf using a small funnel. A screw can be inserted into the funnel to baffle the flow, if needed. Water can be introduced into the funnel in about 5 mm or about 10 mm increments. Water volume was measured prior to pouring onto the shelf, using, for example, graduated cylinders. Water was poured onto the shelf at a distance of about 1 mm to about 2 mm above the shelf. The shelf was continually filled with water until overflow just began to occur. The height of the water retained on the shelf was then determined by dividing the volume of water poured onto the shelf just prior to overflow by the area of the non-hydrophobic region.

Shelves having a hydrophobic spill containment pattern formed using the Ferro frit, and a 1% solution of tridecafluoro-1,1,2,2-tetrahydrooctyl trichlorosilane in hexane applied to the frit, were tested in accordance with the above described method. The silane was cured on the frit at a temperature of about 200° F. for about 15 minutes. The spill containment pattern was formed as a border around the perimeter of the glass shelf, at or near the edge of the shelf. The shelves were tested at varying temperatures and humidity conditions. The average water height retention was about 4.43 mm.

| | Examples No. | | | | | | | |
|---|---|---|---|---|---|---|---|---|
| | 1 | 2 | 3 | 4 | 5 | 6 | 7 | 8 |
| Ambient Temperature (° F.) | 78 | 78 | 78 | 78 | 79 | 79 | 79 | 79 |

-continued

| | | | | | | | | |
|---|---|---|---|---|---|---|---|---|
| Ambient Humidity (%) | 55 | 55 | 55 | 55 | 56 | 56 | 56 | 56 |
| Area of the Nonhydrophobic Region (cm²) | 1639.6 | 1639.6 | 1639.6 | 1639.6 | 1639.6 | 1639.6 | 1639.6 | 1639.6 |
| Height of Retained Water (mm) | 4.57 | 4.45 | 4.27 | 4.45 | 4.39 | 4.39 | 4.33 | 4.33 |

| | Examples No. | | | | | | | |
|---|---|---|---|---|---|---|---|---|
| | 9 | 10 | 11 | 12 | 13 | 14 | 15 | 16 |
| Ambient Temperature (° F.) | 81 | 81 | 81 | 81 | 81 | 81 | 81 | 81 |
| Ambient Humidity (%) | 55 | 55 | 55 | 55 | 56 | 56 | 56 | 56 |
| Area of the Nonhydrophobic Region (cm²) | 1639.6 | 1639.6 | 1639.6 | 1639.6 | 1639.6 | 1639.6 | 1639.6 | 1639.6 |
| Height of Retained Water (mm) | 4.39 | 4.51 | 4.39 | 4.57 | 4.45 | 4.51 | 4.51 | 4.39 |

Shelves prepared with a hydrophobic spill containment pattern using an acid etch surface treatment and tridecafluoro-1,1,2,2-tetrahydrooctyl trichlorosilane as the hydrophobic solution were also tested for water height retention. Acid etching was performed using Armour Etch® Glass Etching Cream. Shelves were prepared by etching for about 3 minutes to about 6 minutes. Example 25 was etched twice using an etching time of from 3 to 6 minutes for each etching process. Specifically, a first etching procedure was performed by applying the etching solution to the substrate, allowing it to remain on the substrate for about 3 minutes to about 6 minutes, and washing the etching solution from the surface of the substrate. A second etching procedure was then performed by again applying the etching solution, allowing it to remain on the substrate for about 3 minutes to about 6 minutes, and washing the etching solution from the surface. The fluorosilane was applied and the shelf was baked for about 20 minutes at 200° F.

The shelves were first tested for water height retention shortly after having the hydrophobic spill containment pattern was formed and cooled. The shelves were then retested sometime after the first test. As shown in the data below, in general, the water height retention properties of the shelves improved after the first testing. Without intending to be bound by theory, it is believed that when the spill containment pattern is first contact with water after formation, additionally silicon oxide groups remaining on the surface of silane and/or the surface-modified substrate by hydrolyzed by the water, thereby creating additional bonding sites between the silane and the surface-modified substrate and improving the hydrophobic nature of the spill containment pattern. The average water height of the acid etch samples was about 5.18 mm. The average water height of the acid etched shelves, which were etched for about 3 minutes was about 5.18 mm. The average water height of the acid etched shelves, which were etched for about 4 minutes was about 5.19 mm. The average water height of the acid etched shelves, which were etched for about 5 minutes was about 5.18 mm. The average water height of the acid etched shelves, which were etched for about 6 minutes was about 5.19 mm.

| | Examples No. | | | | | | | |
|---|---|---|---|---|---|---|---|---|
| | 17 | 18 | 19 | 20 | 21 | 22 | 23 | 24 |
| Etch time (min) | 3 | 3 | 4 | 6 | 3 | 5 | 3 | 4 |
| Area of the Nonhydrophobic Region (cm²) | 982.6 | 982.6 | 982.6 | 982.6 | 982.6 | 982.6 | 982.6 | 982.6 |
| Height of Retained Water (mm) | 5.14 | 5.09 | 4.99 | 5.09 | 4.86 | 5.09 | 5.09 | 5.09 |
| Retested height of retained water (mm) | 5.60 | 5.04 | 5.34 | 5.39 | 5.29 | 5.39 | 5.34 | 5.34 |
| Average | 5.37 | 5.06 | 5.17 | 5.24 | 5.08 | 5.24 | 5.22 | 5.22 |

| | Examples No. | | | | |
|---|---|---|---|---|---|
| | 25 | 26 | 27 | 28 | 29 |
| Etch time | 2 etching procedures performed | 6 | 5 | 6 | 5 |

-continued

| | | | | | |
|---|---|---|---|---|---|
| Area of the Nonhydrophobic Region (cm$^2$) | 982.6 | 982.6 | 982.6 | 982.6 | 982.6 |
| Height of Retained Water (mm) | 5.09 | 5.09 | 5.09 | 5.09 | 5.14 |
| Retested height of retained water (mm) | — | 5.14 | 5.09 | 5.34 | 5.29 |
| Average | — | 5.11 | 5.09 | 5.22 | 5.22 |

Example 30: Abrasion Resistance

Figure 24:
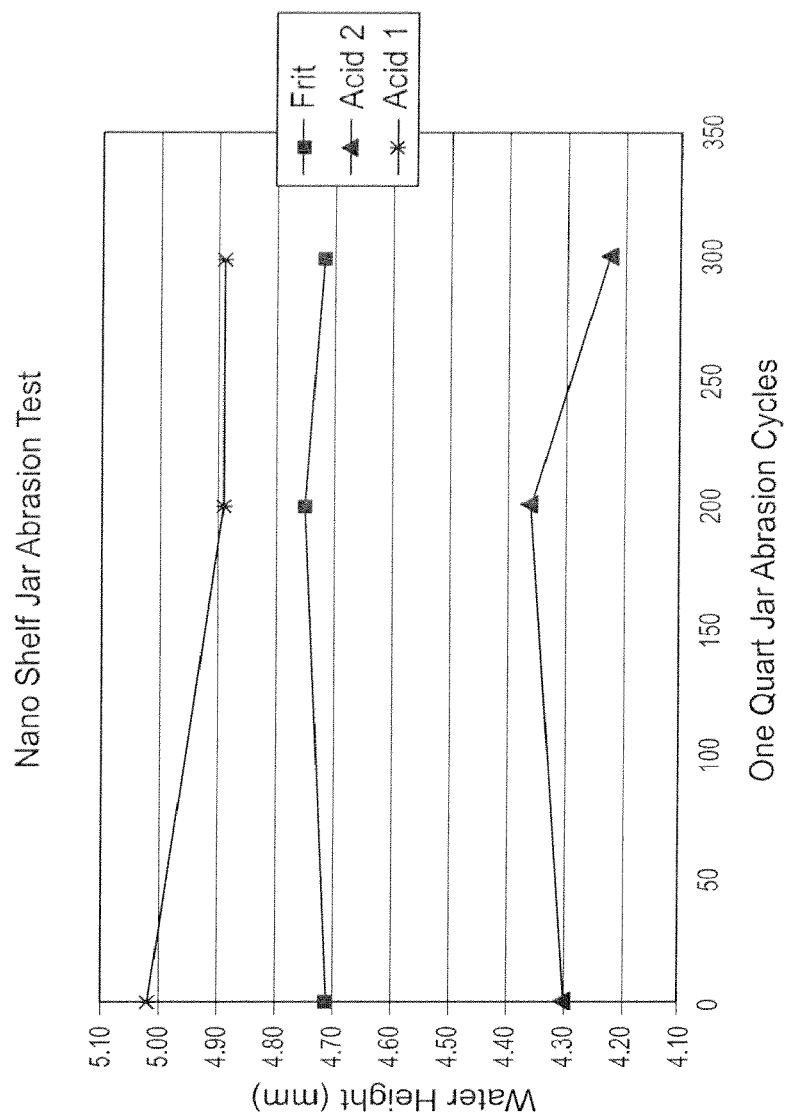
FIG. 24 is a graph showing the water height retention test results after abrasion with a glass jar for three shelves formed in accordance with embodiments of the present disclosure.

The shelves having a hydrophobic spill containment pattern of various embodiments of the present disclosure were tested to determine the ability of the shelf to retain a spill (simulated by water) following repeated abrasion of the hydrophobic treatment. The amount of water retained by the shelf before failure was measured before any abrasions were applied using the method described above and the height of the retained water was calculated. Next, a one quart glass jar was used to make abrasions by placing it on the hydrophobic region and sliding the jar horizontally along the surface of the shelf until the jar has passed over the entire hydrophobic region. The jar was then slide back to its original position, passing over the hydrophobic surface once more. The forward and backward motion of the jar is defined as one jar abrasion cycle. About fifty jar abrasion cycles were performed. The water height retention test was repeated after each fifty abrasion cycles. As shown in FIG. 24, a shelf having a hydrophobic spill containment pattern formed from a ceramic frit and a hydrophobic compound did not lose effectiveness for retaining water in the non-hydrophobic region of the shelf after 300 abrasion cycles. Shelves having a hydrophobic spill containment pattern formed by acid etching the substrate and applying the hydrophobic compound to the acid etched region showed some loss of effectiveness after 300 abrasion cycles.

Example 31: Resistance to Cleaning

The shelves having a hydrophobic spill containment pattern of various embodiments of the present disclosure were tested to determine the ability of the shelf to retain a spill (water) following repeated cleaning cycles. First the shelves were tested prior to any cleaning treatment to determine a baseline water retention level. Water retention height was tested in accordance with the method described above. Next, five cleaning cycles for each of four cleaning methods were performed on the glass shelf. A cleaning cycle is defined as five forward and backward motions of the cleaning product/applicator perpendicular to the hydrophobic treatment with a consistent 2 kg load. Four different cleaning methods were performed along portions of the hydrophobic spill containment pattern, including, Windex wiped with a paper towel, Dawn dish soap wiped with a cotton dish cloth, Formula 409 cleaner wiped with a sponge, and Clorox wipes. Each cleaning method was performed on a separate portion of the spill containment pattern. The water height retention test was repeated after each five cleaning cycles.

The Windex/paper towel cleaning method was prepared by saturating a 5 inch square of paper towel with Windex Original formula so that the paper towel was completely wet, but not dripping. The Dawn dish soap/cotton dish cloth method was performed using a solution containing 2 ml of Dawn dish soap in one liter of room temperature water. The cotton dish cloth was then dipped in the solution and applied to the shelf. The Formula 409/sponge method was performed by cutting a sponge into an approximately 1 inch by 1 inch square and saturating the sponge with Formula 409 All Purpose Cleaner. The Clorox wipe method was performed using a Clorox Wipe folded into a 1 inch by 1 inch square. All methods were performed using a 2 kg mass applied to the applicator.

Figure 25:
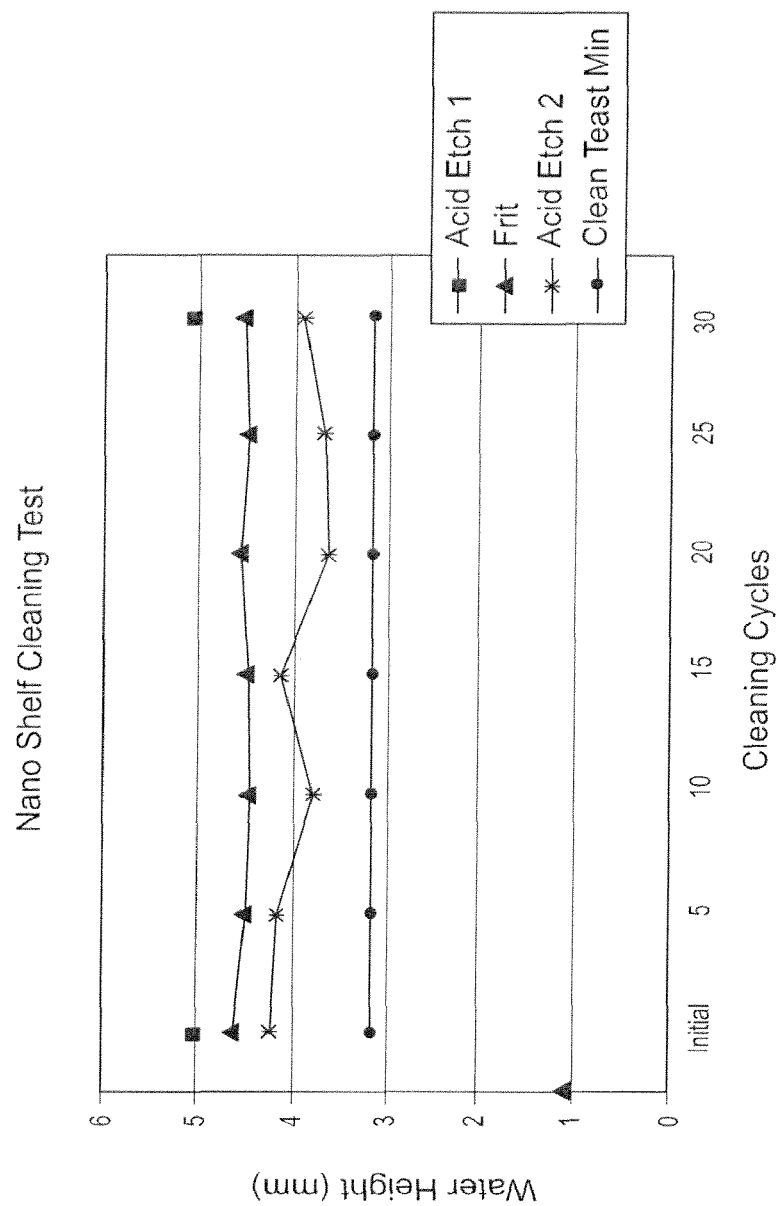
FIG. 25 is a graph showing the water height retention test results after performing a cleaning process on three shelves formed in accordance with embodiments of the present disclosure.

As shown in FIG. 25, a shelf having a hydrophobic pattern formed from a ceramic frit and a hydrophobic compound did not lose effectiveness after 30 cleaning cycles. Shelves having a hydrophobic spill containment pattern formed by acid etching the glass substrate and applying a hydrophobic compound to the etched portion minimally lost effectiveness after 30 cleaning cycles.

Example 32: Stain Resistance

Figure 26A:
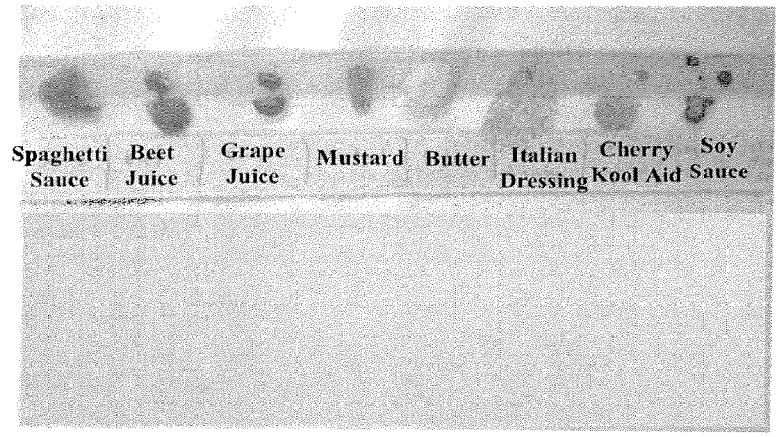
FIGS. 26A and 26B are photographs demonstrating the stain resistant properties of a shelf having a hydrophobic spill containment pattern formed of a ceramic frit and a hydrophobic compound in accordance with an embodiment of the present disclosure.
Figure 26B:
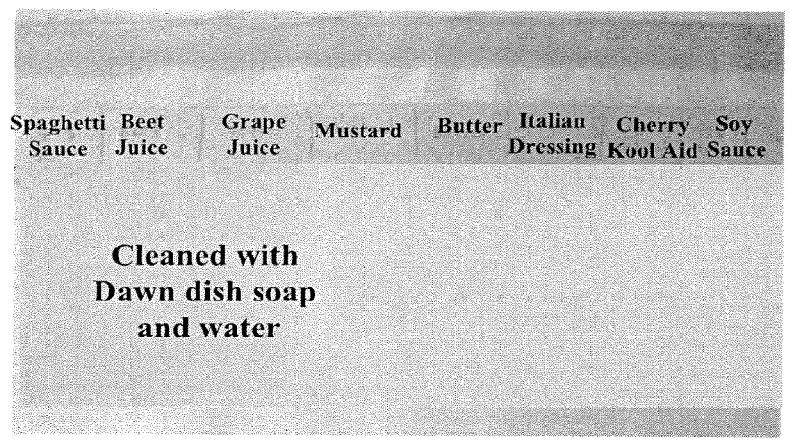

Stain resistance of a shelf having a hydrophobic spill containment pattern in accordance with an embodiment of the present disclosure was tested against a variety of staining agents, including, spaghetti sauce, canned beets, grape juice, yellow mustard, butter, Italian dressing, cherry Kool-Aid, and Soy sauce. Each staining agent was applied to approximately one inch areas of the shelf, including a portion of the hydrophobic spill containment pattern and the non-hydrophobic region, and then allowed to stand for approximately 72 hours. The majority of the dried material was then wiped from the shelf with a paper towel and clean wash cloth containing a mixture of water and Dawn dish soap was used to remove any remnants of the material. As shown in FIGS. 26A and 26B, a shelf having a hydrophobic still containment pattern formed from a ceramic frit and a hydrophobic compound in accordance with an embodiment of the present disclosure was stain resistant to all staining agents.

As earlier described, the hydrophobic surface arranged in a spill containment pattern in accordance with the preferred embodiments provides a spill containment feature which prevents spilled liquids from leaking off of the top surface of the shelf, and shelves in accordance with the preferred embodiments can be used in various applications, such as refrigerator shelves.

It will be apparent to those skilled in the pertinent arts that other embodiments of shelving members in accordance with the invention may be designed. That is, the principles of shelving members in accordance with the disclosure are not limited to the specific embodiments described herein. For example, shelf members or other support surfaces having a hydrophobic spill containment surfaces could be used in various settings, such as shelving in other settings, tables, countertops or the like, and are not limited to use as refrigerator shelves.

Further, it will be apparent to those skilled in the pertinent art that any method which may be used for creating a hydrophobic surface arranged in a spill containment pattern in substantially the same plane as the top surface of the shelf member is within the scope of the disclosure described herein, even if such method requires the use of multiple pieces to manufacture the shelf member. For example, a frame of hydrophobic material may be bonded to the shelf member such that it forms a continuous border which is generally in the same plane as the top surface of the shelf. Accordingly, it will be apparent to those skilled in the art that modifications and other variations of the above-described illustrative embodiments of the disclosure may be effected without departing from the spirit and scope of the novel concepts of the invention.

What is claimed:

1. A shelf assembly comprising:
   a shelf panel having a top surface for supporting articles; and
   a hydrophobic surface applied in a spill containment pattern on the top surface of the shelf panel such that the hydrophobic surface defines a boundary of a central portion of the top surface of the shelf panel,
   the hydrophobic surface is applied in the spill containment pattern on the top surface of the shelf panel, the hydrophobic surface comprising a plurality of edge containment strips, each edge containment strip disposed adjacent to one of a plurality of perimeter edges of the shelf panel, and wherein:
   (a) at least one of the edge containment strips is offset inward from the respective perimeter edge of the shelf panel, or
   (b) each of the edge containment strips is located directly at a respective perimeter edge of the shelf panel.

2. The shelf assembly of claim 1, comprising (a) and wherein each of the edge containment strips is offset inward from the respective perimeter edges of the shelf panel.

3. The shelf assembly of claim 1, comprising (a) and wherein the hydrophobic surface comprises a hydrophobic compound applied over a frit layer on the top surface of the shelf panel, but there is no frit layer in an area between the at least one offset edge containment strip and the respective perimeter edge of the shelf panel.

4. The shelf assembly of claim 3, wherein the frit layer is disposed adjacent to and bonded to the top surface of the shelf panel.

5. The shelf assembly of claim 1, wherein said spill containment pattern is a continuous border which defines a single central portion within said border.

6. The shelf assembly of claim 1, wherein the hydrophobic surface comprises a compound selected from the group consisting of fluorocarbons, fluoroalkyl silanes, fluoroalkoxy silanes, fluoroalkyl alkyl silanes, and combinations thereof.

7. The shelf assembly of claim 1, wherein the shelf panel is a refrigerator shelf.

8. The shelf assembly of claim 1, further comprising a pair of brackets for supporting the shelf panel in a cavity of an appliance.

9. The shelf assembly of claim 8, wherein the shelf panel comprises side edges proximate to which the pair of brackets are attached, each bracket including a protector portion that extends laterally outward beyond the corresponding side edge of the shelf panel to thereby provide impact protection to the side edges.

10. The shelf assembly of claim 9, wherein the protector portions of the brackets further extend upward adjacent to the corresponding side edges of the shelf panel to provide further impact protection to the side edges.

11. The shelf assembly of claim 8, wherein each of the brackets is attached to the bottom surface of the shelf panel such that the top surface of the shelf panel is completely free from intrusion or other obstruction, thereby maximizing the available shelf space on the top surface of the shelf panel.

12. The shelf assembly of claim 1, wherein the hydrophobic surface completely encircles the central portion of the top surface of the shelf panel.

13. A method of manufacturing a shelf capable of containing liquid spills thereon, the method comprising:
   (a) providing a shelf panel having a top surface;
   (b) applying a hydrophobic surface to the top surface of the shelf panel in a spill containment pattern, the hydrophobic surface extending in a plurality of edge containment strips of the containment pattern along a respective plurality of perimeter edges of the shelf panel, wherein applying the hydrophobic surface comprises either:
      (i) applying the hydrophobic surface of at least one of the edge containment strips offset inward from the respective perimeter edge of the shelf panel, or
      (ii) applying the hydrophobic surface of each of the edge containment strips directly at a respective perimeter edge of the shelf panel;
   (c) wherein applying the hydrophobic surface comprises:
      (i) applying a hydrophobic compound arranged in the spill containment pattern; and
      (ii) not applying the hydrophobic compound to a central portion of the top surface of the shelf panel such that the hydrophobic compound defines a boundary of the central portion of the shelf panel.

14. The method of claim 13, comprising (a) and wherein applying the hydrophobic surface to the top surface of the shelf panel comprises applying a frit layer in each of the plurality of edge containment strips to the top surface of the shelf panel at a location that is offset from the respective perimeter edge of the shelf panel.

15. The method of claim 14, wherein applying the frit layer and the hydrophobic compound comprises applying the frit layer and the hydrophobic compound in a spill containment pattern that completely encircles the central portion of the shelf panel.

16. The method of claim 14, comprising (a) and further comprising not applying the frit layer within an area disposed between the at least one offset edge containment strip and the respective perimeter edge of the shelf panel.

17. The method of claim 14, further comprising:
   curing the frit layer to couple the frit to the top surface of the panel; and
   curing the hydrophobic compound.

18. The method of claim 17, wherein curing the frit layer comprises heating the frit layer to a temperature in a range of about 1000° F. to about 1400° F.

19. The method of claim 17, wherein curing the hydrophobic compound comprises curing the hydrophobic compound at a temperature in a range of about ambient ° F. to about 600° F.

20. The method of claim 13, wherein applying the hydrophobic compound comprises applying a hydrophobic solution comprising the hydrophobic compound dispersed or dissolved in a solvent to the cured frit.

* * * * *